(12) United States Patent
Yang et al.

(10) Patent No.: US 11,212,689 B2
(45) Date of Patent: Dec. 28, 2021

(54) INTERFERENCE PROCESSING METHOD AND DEVICE, APPARATUS AND STORAGE MEDIUM

(71) Applicant: XI'AN ZHONGXING NEW SOFTWARE CO., LTD., Xi'An (CN)

(72) Inventors: Ling Yang, Shenzhen (CN); Yajun Zhao, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 94 days.

(21) Appl. No.: 16/346,512

(22) PCT Filed: Nov. 1, 2017

(86) PCT No.: PCT/CN2017/109002
§ 371 (c)(1),
(2) Date: Jul. 29, 2019

(87) PCT Pub. No.: WO2018/082580
PCT Pub. Date: May 11, 2018

(65) Prior Publication Data
US 2019/0364449 A1    Nov. 28, 2019

(30) Foreign Application Priority Data

Nov. 4, 2016   (CN) .......................... 201610963489.1
Apr. 10, 2017  (CN) .......................... 201710229770.7

(51) Int. Cl.
*H04W 24/10*   (2009.01)
*H04B 17/336*  (2015.01)
(Continued)

(52) U.S. Cl.
CPC .......... *H04W 24/10* (2013.01); *H04B 17/336* (2015.01); *H04W 72/042* (2013.01);
(Continued)

(58) Field of Classification Search
CPC ... H04W 24/10; H04W 76/27; H04W 72/042; H04W 72/044; H04W 72/046; H04B 17/336
See application file for complete search history.

(56) References Cited

U.S. PATENT DOCUMENTS 9,281,912 B2    3/2016  Peng et al.
2012/0327867 A1* 12/2012 Kela .................. H04W 72/082
                                                      370/329
(Continued)

FOREIGN PATENT DOCUMENTS

| CN | 102202400 A | 9/2011 |
| CN | 103391581 A | 11/2013 |
| WO | WO 2015072720 A1 | 5/2015 |

OTHER PUBLICATIONS

International Search Report dated Dec. 27, 2017 for International Application No. PCT/CN2017/109002, 5 pages.
(Continued)

*Primary Examiner* — Brenda H Pham
(74) *Attorney, Agent, or Firm* — Knobbe, Martens, Olson & Bear, LLP

(57) ABSTRACT

Disclosed by an embodiment of the present disclosure is an interference processing method. The method includes that: a transmission apparatus obtains first indication information; and the transmission apparatus performs transmission on a particular resource according to the first indication information. Moreover, also disclosed by embodiments of the present disclosure are an interference processing device, an apparatus and a storage medium.

18 Claims, 9 Drawing Sheets

(51) Int. Cl.
H04W 76/27 (2018.01)
H04W 72/04 (2009.01)

(52) U.S. Cl.
CPC ..... *H04W 72/046* (2013.01); *H04W 72/0446* (2013.01); *H04W 76/27* (2018.02)

(56) References Cited

U.S. PATENT DOCUMENTS

| | | | | |
|---|---|---|---|---|
| 2013/0142062 A1* | 6/2013 | Dinan | ............... | H04W 24/02 |
| | | | | 370/252 |
| 2013/0329612 A1* | 12/2013 | Seo | ............... | H04B 7/2656 |
| | | | | 370/280 |
| 2014/0133365 A1 | 5/2014 | Peng et al. | | |
| 2014/0226590 A1* | 8/2014 | Ahn | ............... | H04W 72/0413 |
| | | | | 370/329 |
| 2016/0262165 A1 | 9/2016 | Lee et al. | | |

OTHER PUBLICATIONS

Written Opinion of the International Searching Authority dated Dec. 27, 2017 for International Application No. PCT/CN2017/109002, 3 pages.

\* cited by examiner

INTERFERENCE PROCESSING METHOD AND DEVICE, APPARATUS AND STORAGE MEDIUM

CROSS REFERENCE TO RELATED APPLICATIONS

This application is filed based on and claims priority to a Chinese patent application No. 201610963489.1 filed on Nov. 4, 2016, the content of which is incorporated herein by reference in their entireties.

This application is filed based on and claims priority to a Chinese patent application No. 201710229770.7 filed on Apr. 10, 2017, the content of which is incorporated herein by reference in their entireties.

TECHNICAL FIELD

The present disclosure relates to the field of wireless communication and, in particular, to an interference processing method and device, an apparatus and a storage medium.

BACKGROUND

At present, two duplexing modes: time division duplexing (TDD) and frequency division duplexing (FDD) are used by the long term evolution (LTE) system.

For a mobile communication system in the FDD mode, reception and transmission are carried out on two separate channels whose frequencies are symmetric, and a guard frequency band is used for separating the reception channel and the transmission channel to avoid mutual interference between signals. One segment of spectrum resources is used for transmission of a downlink signal, and the other segment of spectrum resources is used for transmission of an uplink signal. For a mobile communication system in the TDD mode, the uplink communication and the downlink communication between a base station and a user equipment (UE) are performed in different time slots of the same frequency channel (also referred to as carrier), and time is used for separating the reception channel and the transmission channel. In this duplex mode, the base station and the user equipment (UE) need to be concerted to work smoothly.

Based on the above analysis, the FDD system uses symmetric spectrum resources and allocates equal resources to uplink and downlink. This allocation method is very suitable for a traditional communication system in which the voice services are dominated. In the case where the amount of uplink traffic and the amount of the downlink traffic are not symmetric, a huge amount of resources may be wasted. The TDD system has a different time resource allocation mode, and can adjust the proportion of uplink and downlink resources according to a variation of the number of services of the network. However, the TDD network requires strict time synchronization of the uplink-downlink switch between base stations and between the base station and the UE. This requires the entire network to use the same uplink-downlink subframe ratio.

However, with the rapid growth of the variety and number of mobile broadband services and the rapid development of mobile terminals, the demand for wireless communications is increasing. The uplink traffic demand and downlink traffic demand vary not only with time but also with different geographical regions. This causes that the existing duplex mode of wireless communication networks cannot flexibly adapt to the current network development.

Based on this, a flexible duplex mode will be an important research topic in the future 5th-Generation (5G) mobile communication technology, New Radio (NR). The original intention of this topic is to enable each base station in the system to dynamically adjust the ratio of the slots occupied by uplink transmission to the slots occupied by downlink transmission according to the ratio of the uplink traffic amount to the downlink traffic amount. Due to this feature, at the same clock, one of neighbor cells transmits a downlink signal and another one of the neighbor cells transmits an uplink signal. That is, in the existing 5G network, in addition to interference from the base station to the UE and interference from the UE to the base station in the traditional system, cross-link interference: interference from the base station to the base station and interference from the UE to the UE also exists. Moreover, in the cross-link interference described above, not only the data channel has the cross-link interference, but also the control channel has the link interference problem. At present, there is no effective solution for processing the above-mentioned control channel interference and/or data channel interference.

SUMMARY

In view of this, embodiments of the present disclosure are desired to provide an interference processing method and device, an apparatus, and a storage medium to reduce cross-link interference caused by a flexible duplex mode.

Technical solutions of embodiments of the present disclosure are implemented as described below.

In a first aspect, an embodiment of the present disclosure provides an interference processing method. The method includes: obtaining, by a transmission apparatus, first indication information; and performing, by the transmission apparatus, transmission on a particular resource according to the first indication information.

In a second aspect, an embodiment of the present disclosure provides an interference processing device. The device includes: an obtaining part, which is configured to obtain first indication information; and a transmission part, which is configured to perform transmission on a particular resource according to the first indication information.

In a third aspect, an embodiment of the present disclosure provides a computer-readable storage medium storing computer programs. When the computer programs are executed by a processor, the steps in the above-mentioned interference processing method are implemented.

In a fourth aspect, an embodiment of the present disclosure provides an interference processing apparatus. The apparatus includes a memory and a processor. The memory is configured to store computer programs executable by the processor, and the processor is configured to execute the programs to implement the steps in the above-mentioned interference processing method.

The embodiments of the present disclosure provide an interference processing method and device, an apparatus and a storage medium. The transmission apparatus obtains the first indication information and then performs transmission on the particular resource according to the first indication information. Thus, the cross-link interference caused by the flexible duplex mode is reduced or decreased to some extent or solved.

DETAILED DESCRIPTION

Figure 1:
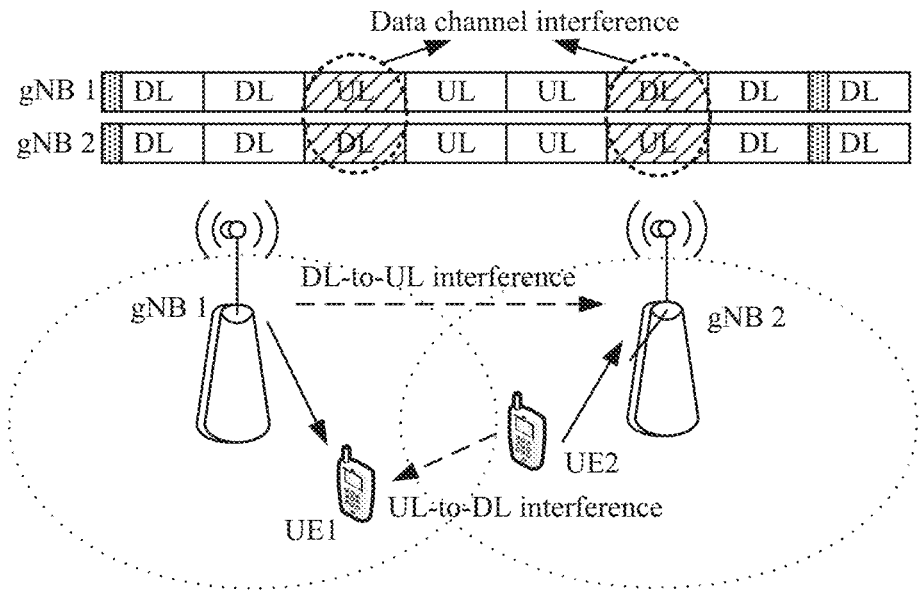
FIG. 1 is a schematic diagram illustrating data channel interference between adjacent apparatuses which use a same numerology parameter according to an embodiment of the present disclosure.

The technical solutions of the embodiments of the present disclosure will be clearly and completely described below in conjunction with the drawings in the embodiments of the present disclosure.

A transmission node/apparatus described in the present disclosure may be a base station or a UE. The base station may be a macro eNB or a small cell eNB.

In the present disclosure, for a particular resource, its resource attribute may be a fixed resource and/or a dynamic resource, and/or the resource attribute on the resource is not fixed or is determined/changed flexibly or dynamically (that is, it is uncertain whether uplink transmission and/or downlink transmission is performed on the resource, and/or a gap and/or a sensing position and/or an interference measurement position and/or a control channel position is uncertain).

Reference signal information in the present disclosure refers to a sequence of the reference signal, and/or a sequence number of the reference signal, and/or a cyclic shift of the reference signal, and/or a cyclic shift serial number of the reference signal, and/or a time domain position of the reference signal, and/or a time domain starting position of the reference signal, and/or a time domain length of the reference signal, and/or a time domain end position of the reference signal, and/or the number of the time domain resources occupied by the reference signal, and/or a time domain gap of the reference signal, and/or a time domain pattern of the reference signal, and/or a frequency domain position of the reference signal, and/or a frequency domain starting position of the reference signal, and/or a frequency domain length of the reference signal, and/or a frequency domain end position of the reference signal, and/or the number of frequency domain resources occupied by the reference signal, and/or a frequency domain gap of the reference signal, and/or a frequency domain pattern of the reference signal. The resource may be at least one of: an orthogonal frequency division multiplexing (OFDM) symbol, a slot, a mini-slot, or a subframe. The reference signal may exist in the slot, and/or in the mini-slot, and/or in the subframe. The transmission of the reference signal may be triggered by signaling. Alternatively, the reference signal may be transmitted at a fixed position or transmitted at a periodic point.

In other embodiments, different apparatuses, or apparatuses with different traffic types, or apparatuses with different numerology configurations uses the same numerology parameter for the transmission of the reference signal, and/or the transmission of the control channel, and/or the transmission of the sensing signal, and/or the transmission of the occupancy signal and/or the transmission of system information, and/or the transmission of the at least one of the four Msg messages in the random access. The transmission of other signals/channels may be based on their respective numerology parameters.

The reference signal in the present disclosure includes one of: a cell-specific reference signal (CRS), a demodulation reference signal (DMRS), a multicast/broadcast over single frequency network (MBSFN) reference signal, a position reference signal (PRS), a dedicated reference signal (DRS), and a sounding reference signal (SRS).

The system message in the present disclosure includes at least one of: a master information block (MIB), a system information block (SIB), a physical broadcast channel (PBCH), or the like.

Relevant random access information of a physical random access channel (PRACH) in the present disclosure includes at least one of: Preamble, Msg1, Msg2, Msg3, or Msg4. Information transmitted on a particular resource is protected from interference or the impact of interference is reduced mainly by an alignment of particular resources of apparatuses.

The blank resource information in the present disclosure includes at least one of: in the time domain, a starting position of a blank resource, a size of the blank resource, a length of the blank resource, an end position of the blank resource, and a blank resource indication identifier (the identifier may include at least one of: a time domain, a frequency domain, a code domain, or a spatial domain); in the frequency domain: a starting position of the blank resource, a size of the blank resource, a length of the blank resource, and an end position of the blank resource; and in a spatial domain, a blanked beam direction, a beam width, a beamforming weight, and a blanked beam pattern.

The resource configuration information in the present disclosure includes at least one of: a data resource position, a data transmission direction on a resource, a control resource position, a resource attribute, a resource indicator, fixed resources, specific channels/signals transmitted on the fixed resource, which resources can be configured flexibly, a measurement resource position, a sensing resource position, or the like. The main idea is as follows. In the flexible TDD system, all/part of the resources are fixed, and/or all/part of the resources may be flexibly configured, and/or whether the fixed part of resources is determined for transmitting which information. Whether to perform a sensing operation before performing transmission on the fixed/predetermined resource and/or flexibly configured resource; and/or sending notification/indication information to a surrounding apparatus; and/or information is exchanged/coordinated with the surrounding apparatus, for example, the information is to be transmitted on the resource, a numerology parameter, position information of a resource for use, position information of a resource uncertain for use, information of a channel and/or signal transmitted on a resource for pre-use, a sequence, a cyclic shift, sensing operation position information, control channel position information, a power adjustment indication, a transmission direction, an transmission direction adjustment indication, priority information, a beam direction, a beamforming weight, and a beam pattern; and/or the sensing operation is performed at the starting position of the resource. In other embodiments, for the flexibly configured resource and/or the fixed/predetermined resource, the resource allocation status of the flexible and/or fixed/predetermined resource may be indicated through control signaling. The fixed/predetermined resource may be used for transmitting at least one of a control channel, a data channel, system information, a primary synchronization signal (PSS)/secondary synchronization signal (SSS), a reference signal, or a random access related process, for the purpose of reducing cross-link interference of data channel and/or control channel to a certain extent if one of the above information between different apparatuses is sent at the fixed/predetermined position. The resource attribute may be cell-specific, and/or UE-specific, and/or, team-specific, and/or common-specific. In other embodiments, if it is based on the pre-indicated/configured resource allocation status, before actual transmission, the apparatus may adjust an actual resource usage/configuration status according to different traffic reliability requirements, and/or priorities of different traffic/channels/signals/apparatuses, and/or the uplink traffic amount and the downlink traffic amount which are dynamically changing, and/or a sensing result, and/or an interference measurement result, and/or an interference level, and/or coordination/interaction information, and/or a signaling indication. The resource usage/configuration status may be understood as follows. The resource is used for uplink data transmission previously, and is adjusted to be used for downlink transmission due to the above information. Alternatively, a UE scheduled on the resource is adjusted. Alternatively, no transmission is performed (i.e., the resource is blanked). Alternatively/additionally, a data channel and/or a control channel and/or a sensing position/transmission structure is adjusted, and/or transmitting power on the resource is adjusted and the like.

The frame structure in the present disclosure includes at least one of: a type 1 frame structure (e.g., FDD), a type 2 frame structure (e.g., TDD), a type 3 frame structure (e.g., a flexible or dynamic frame structure), a completely flexible subframe ratio/subframe type, or a frame structure including fixed part and a flexible or dynamic part.

The carrier information in the present disclosure refers to one carrier, or multiple carriers, or a pair of carriers, or at least one of an FDD carrier, a TDD carrier, a flexible duplex carrier, or a full duplex carrier.

The pattern index number in the present disclosure refers to that a resource pattern can be determined according to the pattern index number. The resource may be at least one of a control channel resource, a data channel resource, a system information resource, a PSS/SSS resource, a reference signal resource, or a random access related process resource. The resource pattern may also be determined by at least one of the following parameters: a starting position, an end position, a gap between resources, a size of a resource, the number of resources, an offset, or a period.

The transmission time window information in the present disclosure refers to that the resources in the transmission time window can be used for transmitting at least one of a control channel, a data channel, system information, a PSS/SSS, a reference signal, or a random access related process. Resources in the time window may be continuous in the time domain or discrete in the time domain. The resource in the time window may be determined by at least one of the following parameters: a starting position, an end position, a gap between resources, a size/length of a resource, the number of resources, an offset, or a period.

In the present disclosure, the first indication information and the second indication information may be sent at the same position or different positions, and/or may have the same information content or different information content.

In the present disclosure, the first threshold value and the second threshold value may be the same or different. Preferably, the second threshold value is greater than and/or equal to the first threshold value. The threshold may be in units of dbms or the threshold is unitless. The first threshold value and the second threshold value may be determined through at least one of: predefinition, a physical layer downlink control information (DCI) signaling indication, a higher layer radio resource control (RRC) signaling indication, negotiation between base stations, negotiation between a base station and a UE, or negotiation between UEs. In other embodiments, for the control channel and the data channel, if the sensing operation needs to be performed on the control channel and/or the data channel, the control channel and the data channel may have different configurations or the same threshold value configuration.

The numerology parameter described in the present disclosure includes at least one of: a subcarrier spacing, a cyclic prefix (CP), a slot, a mini-slot, the number of OFDM symbols in the mini-slot, the number of OFDM symbols included in the slot, a subframe, a length of an OFDM symbol included in the subframe, the number of mini-slots in the subframe, the number of slots in the subframe, the number of mini-slots in the slot, a length of a gap, or the number of symbols occupied by the gap. The gap may be used for performing the sensing operation. The gap position information may be fixed or dynamically indicated through physical layer DCI signaling.

The mixed subframe type described in the present disclosure includes at least one of the following: downlink control+data; downlink control+gap+data; downlink control+data+gap; gap+downlink control+data; gap+downlink control+gap+data; gap+downlink control+data+gap; downlink control+gap+data+gap; gap+downlink control+gap+data+gap; data+uplink control; data+gap+uplink control; data+uplink control+gap; gap+data+uplink control; gap+data+gap+uplink control; gap+data+uplink control+gap; data+gap+uplink control+gap; gap+data+gap+uplink control; downlink control+data+uplink control; downlink control+gap+data+uplink control; downlink control+data+gap+uplink control; downlink control+data+uplink control+gap; gap+downlink control+data+uplink control; downlink control+gap+data+gap+uplink control; downlink control+data+gap+uplink control+gap; downlink control+data+gap+uplink control+gap; gap+downlink control+gap+data+uplink control; gap+downlink control+data+gap+uplink control; gap+downlink control+data+uplink control+gap; gap+downlink control+gap+data+gap+uplink control; gap+downlink control+gap+data+uplink control+gap; or downlink control+gap+data+gap+uplink control+gap. For example, the mixed subframe type is downlink control+data, which indicates that downlink control is followed by data. For another example, the mixed subframe type is downlink control+gap+data, which indicates that downlink control is followed by a gap, and the gap is followed by data.

The time domain structure of the time unit described in the present disclosure may be: uplink, or downlink, or a mixed structure. The mixed structure may be any combination of downlink control, data (which may be uplink data or downlink data), uplink control, and a time gap. The position of gap may be before or after the time domain position of downlink control and/or data and/or uplink control, alternatively the position of gap may be above or below the frequency domain position of downlink control and/or data and/or uplink control. For example, downlink control+data; or (in a case of one gap) downlink control+gap+data, or downlink control+data+gap, or gap+downlink control+data; or (in a case of two gaps) gap+downlink control+gap+data, or gap+downlink control+data+gap, or downlink control+gap+data+gap; or (in a case of three gaps) gap+downlink control+gap+data+gap; or data+uplink control; or (in a case of one gap) data+gap+uplink control, or data+uplink control+gap, or gap+data+uplink control; or (in a case of two gaps) gap+data+gap+uplink control, or gap+data+uplink control+gap, or data+gap+uplink control+gap; or (in a case of three gaps) gap+data+gap+uplink control+gap; or downlink control+data+uplink control; or (in a case of one gap) downlink control+gap+data+uplink control, or downlink control+data+gap+uplink control, or downlink control+data+uplink control+gap, or gap+downlink control+data+uplink control; or (in a case of two gaps) downlink control+gap+data+gap+uplink control, or downlink control+data+gap+uplink control+gap, or downlink control+data+gap+uplink control+gap, or gap+downlink control+gap+data+uplink control, or gap+downlink control+data+gap+uplink control, or gap+downlink control+data+uplink control+gap; or (in a case of three gaps) gap+downlink control+gap+data+gap+uplink control, or gap+downlink control+gap+data+uplink control+gap, or downlink control+gap+data+gap+uplink control+gap.

In other embodiments, the above time unit may include one or several uplinks, and/or downlinks, and/or a mixed structure. The time unit granularity may be a subframe, or a slot, or a mini-slot, or an OFDM symbol.

In other embodiments, the time unit structure and/or parameters or elements constituting the time unit may be obtained through: physical layer DCI signaling, or higher layer RRC signaling, negotiation/interaction between base stations, or negotiation/interaction between UEs, or negotiation between a base station and a UE, or predefined. Nodes may exchange information via an X2 interface or an air interface. For further detailed signaling indications, reference may be made to the method in the embodiment.

The method in the present disclosure is applicable to solving the problem of link interference between a macro eNB and a small cell eNB, or between small cell eNBs, or between macro eNBs, or between terminals in a CA architecture, is also applicable to solving the problem of link interference in the DC scenario, and is also applicable to solving the problem of link interference between different macro eNBs or different small cell eNBs or different UEs in a single cell, and is also applicable to solving the problem of link interference in any scenario. In addition, the method is also applicable to solving the interference problem in the homogeneous system/heterogeneous system, the same operator or different operators, or in the synchronization or non-synchronization scenario.

The numerology parameter described in the present disclosure includes at least one of: a subcarrier spacing, a CP, a slot, a mini-slot, the number of OFDM symbols in the mini-slot, the number of OFDM symbols in the slot, a subframe, a length of an OFDM symbol in the subframe, the number of mini-slots in the subframe, the number of slots in the subframe, or the number of mini-slots in the slot.

Embodiment 1

The embodiment mainly provides a transmission position of a control channel in a time interval and an obtaining manner of the transmission position.

It is well known that, in a wireless communication system, the control channel is very important. For downlink transmission, if the control channel is missed, the downlink data channel is missed. For the uplink, if uplink grant is missed, an uplink transmission opportunity is lost. For a signal sent aperiodically, if the trigger signaling is missed, a corresponding signal cannot be sent according to requirements, thus system performance is affected.

Based on this, in a flexible duplex or dynamic TDD system, it is necessary to ensure that the control channel is protected from interference so as to prevent important information from being missed or lost. In the dynamic TDD, the transmission direction in each time unit may be dynamically changed. The time unit may be at least one of: a subframe, a slot, a mini-slot, a basic transmission unit, an OFDM symbol, a scheduling unit, and a time zone combined by at least one thereof. A small slot (also referred to as mini-slot) is a time zone that has a smaller number of time domain resources or a shorter time domain length than a slot. One slot may include k mini-slots. k is a positive integer greater than and/or equal to 1. The smallest time domain unit in the slot and/or the mini-slot is the OFDM symbol. Preferably, the numbers of and/or the lengths of OFDM symbols in different slots or mini-slots may be different/the same. The basic transmission unit is a time zone including p particular time domain resources. The particular time domain resource may be at least one of: a subframe, a radio frame, a slot, a mini-slot, or an OFDM symbol. p is a positive integer greater than and/or equal to 1. The transmission direction is uplink and/or downlink.

In other embodiments, the position of the control channel (including time domain and/or frequency domain) in the time unit may be on at least one of: a front particular time domain resource, an ending particular time domain resource, an upper frequency domain resource in a particular frequency band, or a downlink frequency domain resource in a particular frequency band. The particular time domain resource may include t time domain resources. The time domain resource granularity may be at least one of: a mini-OFDM symbol (it may be understood that the mini-OFDM symbol has a shorter length than an OFDM symbol), an OFDM symbol, a slot, a mini-slot, or a subframe. t is a positive integer greater than and/or equal to 1. The particular frequency band may be an entire bandwidth, or subband, or resource block (RB), or resource block group (RBG), resource element (RE), or subcarrier. Accordingly, the particular resource on the particular frequency band may be m subcarriers or RBs or subbands.

In other embodiments, position information (e.g., a starting position of a time domain resource, the number of time domain resources, a gap between time domain resources, a time domain pattern, a time domain pattern index, a starting position of a frequency domain resource, the number of frequency domain resources, a gap between frequency domain resources, a frequency domain pattern, and a frequency domain pattern index) of the control channel may be determined through at least one of: physical layer DCI signaling, predefinition, higher layer radio resource control (RRC) signaling, negotiation between base stations, negotiation between a base station and a UE, or negotiation between UEs. In other embodiments, the above signaling carries at least one of: the starting position of the time domain resource, the number of time domain resources, the gap between the time domain resources, the time domain pattern, the time domain pattern index, the starting position of the frequency domain resource, the number of frequency domain resources, the gap between the frequency domain resources, the frequency domain pattern, the frequency domain pattern index, or the like. The position of the control channel is determined based on the indication information in the signaling. In other embodiments, the above signaling may also carry information about the relevant time unit, for example, a time domain structure and/or a frequency domain structure of a time unit, a time unit type (uplink, downlink, or a mixed type, i.e., including at least one of the uplink, the downlink, the control channel, and the gap), scheduling information (e.g., a modulation coding scheme (MCS), a modulation and demodulation scheme, a redundancy version (RV), a hybrid automatic repeat request (HARQ) process number, and the like), a timing relationship (e.g., a timing relationship between downlink control and downlink data, a timing relationship between the downlink control and uplink data, a timing relationship between the uplink data and uplink control, and the like).

Embodiment 2

The embodiment provides cross-link interference analyses in different scenarios. The cross-link interference is divided into: data channel interference, and/or control channel interference.

For flexible duplex or dynamic TDD, the uplink traffic amount and the downlink traffic amount vary with time, so cross-link (also referred to as across-link) interference problem occurs when adjacent apparatuses perform transmission in the same time interval. The cross-link interference (also referred to as across-link) exists not only in the data channel but also in the control channel.

Schematic diagrams illustrating data channel interference and/or control channel interference in several typical scenarios are described below.

In a scenario 1, the data channel interference occurs between adjacent apparatuses which use the same numerology parameter.

As shown in FIG. 1, the block filled with dots (shown as ▓▓▓▓) represents the control channel, and the block filled with lines (as shown as ▨▨▨) is the cross-link interference of the data channel. FIG. 1 illustrates that control channels of the apparatuses are aligned, which avoids a problem of the cross-link interference of the control channel to some extent.

In other embodiments, a control channel may exist between the aligned control channels. Due to flexible uplink or downlink transmission, interference between the control channel and the data channel may exist, and data channel interference caused by opposite transmission directions of apparatuses on the same resource may also occur.

In other embodiments, if the control channels are aligned and no control channel exists on resources outside the aligned control channels, at this time, only cross-link interference of the data channel may occur due to different transmission directions of the apparatuses on the same time zone resource, or the data channel interference occurs between the adjacent apparatuses due to different transmission directions of the adjacent apparatuses on a certain time domain resource.

In a scenario 2, the data channel interference and/or the control channel interference occur between adjacent apparatuses which use the same numerology parameter. When adjacent apparatuses perform transmission in the same time zone according to the mixed subframe type and/or the uplink subframe type or downlink subframe type, control channel interference and/or data channel interference occur. The mixed subframe type includes at least one of: control, data, or gap. In other embodiments, the control includes at least one of: downlink control or uplink control. The data includes at least one of: uplink data or downlink data.

In other embodiments, the scenario 2 may include several cases described below.

Figure 2:
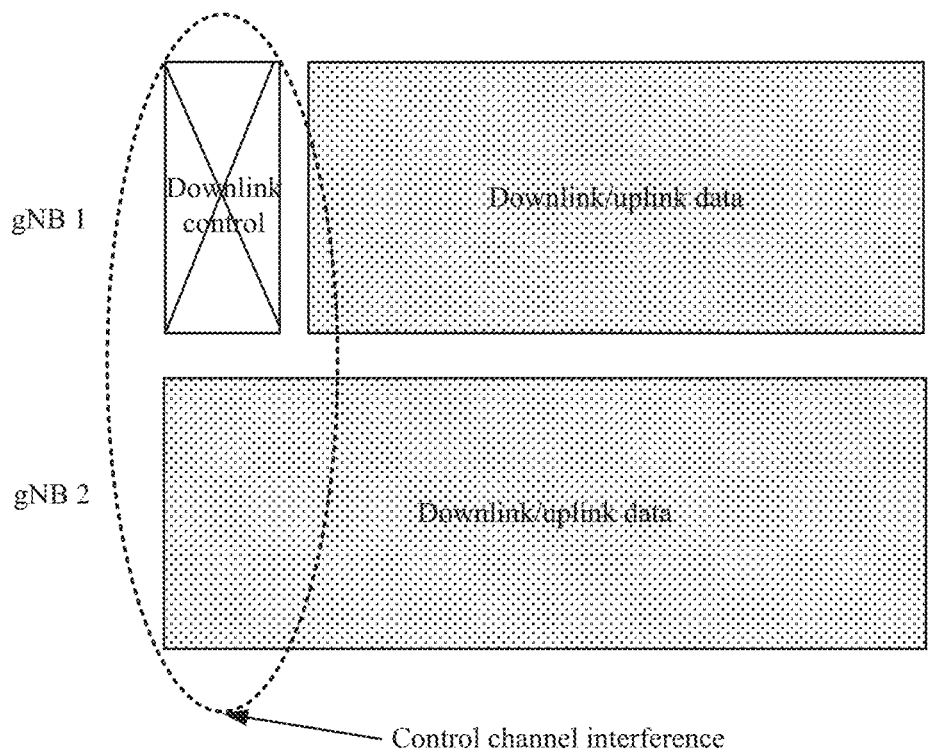
FIG. 2 is a schematic diagram illustrating different transmission subframe structures in a same time zone used by adjacent apparatuses which use a same numerology parameter according to an embodiment of the present disclosure.

In a case 1, adjacent apparatuses which use the same numerology parameter have different transmission subframe structures in the same time zone. As shown in FIG. 2, an apparatus 1 uses the mixed subframe for transmission. The mixed subframe is, for example, downlink control+uplink/ downlink data, or the mixed subframe is, for example, downlink control+gap+uplink/downlink data. An apparatus 2 performs uplink/downlink transmission in the same time zone. At this time, no matter whether the uplink transmission or the downlink transmission is performed on the data channel by the two apparatuses, sending of the downlink control by the apparatus 1 may be interfered by the data channel of the apparatus 2. However, transmission of the data channel of the apparatus 2 may be interfered by the control channel transmission of the apparatus 1. Based on this, it is necessary to solve the control channel interference problem because the control channel is quite important for transmission, decoding and the like.

Similar to the downlink control channel interference illustrated in FIG. 2, the uplink control channel is interfered when an apparatus performs data channel transmission and another adjacent apparatus performs transmission with the mixed subframe. The mixed subframe is, for example, uplink/downlink data+uplink control or uplink/downlink data+gap+uplink control. At this time, the data channel transmission of the apparatus may interfere with the uplink control channel of the adjacent apparatus. For the case 1, if adjacent apparatuses use the same transmission direction on the data channel, no cross-link interference of the data channel occurs. On the contrary, if different transmission directions are used, cross-link interference of the data channel occurs.

Figure 3:
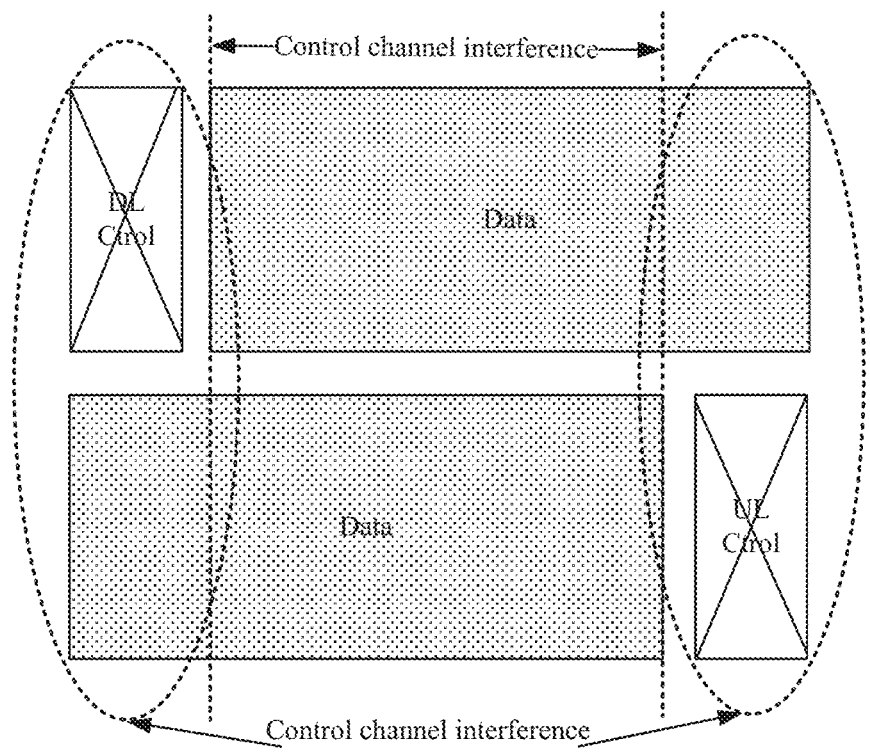
FIG. 3 is a schematic diagram illustrating mixed subframe transmissions with different structures in a same time zone and used by adjacent apparatuses which use a same numerology parameter according to an embodiment of the present disclosure.

In a case 2, adjacent apparatuses which use the same numerology parameter perform transmission with mixed subframes in the same time zone and structures of mixed subframes are different. As shown in FIG. 3, an apparatus uses a transmission structure of downlink control+(in other embodiments, gap)+data, and an adjacent apparatus uses a structure of data+(optionally, gap)+uplink control in the same time zone. Then the downlink control channel and/or the uplink control channel may be interfered. In other embodiments, if adjacent apparatuses use different transmission directions on the data channel, cross-link interference of the data channel also occurs.

Figure 4:
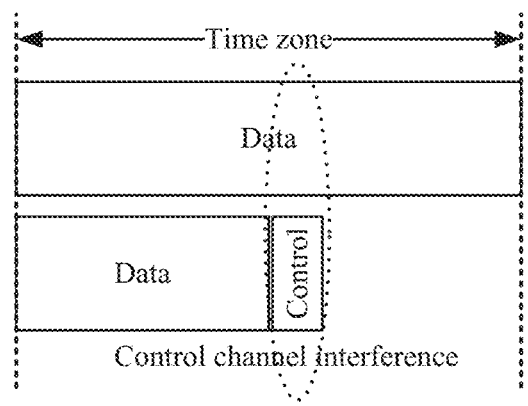
FIG. 4 is a schematic diagram of interference occurring in the case where different types of traffic using a same numerology parameter according to an embodiment of the present disclosure.

In a case 3, different types of traffic using the same numerology parameter are multiplexed in a time zone. For example, when enhanced mobile broadband (eMBB) traffic and ultra reliable and low latency communications (URLLC) traffic are multiplexed and use the same numerology, since the URLLC is very sensitive to delay and the transmission time is usually several OFDM symbols, control channel interference and/or data channel interference may occur. As shown in FIG. 4, if the data channels are transmitted in the same direction in the time zone, data channel cross-link interference may occur. In other embodiments, control channel interference may occur since on a time domain position resource, one apparatus is transmitting the control channel and another apparatus is transmitting data.

In a scenario 3, the data channel interference and/or the control channel interference occur between adjacent apparatuses which use different numerology parameters. Three major types of traffic of the NR 5G are: eMBB, massive machine type communication (mMTC), and URLLC. Data channel interference and/or control channel interference occur when different types of traffic are multiplexed together.

Figure 5:
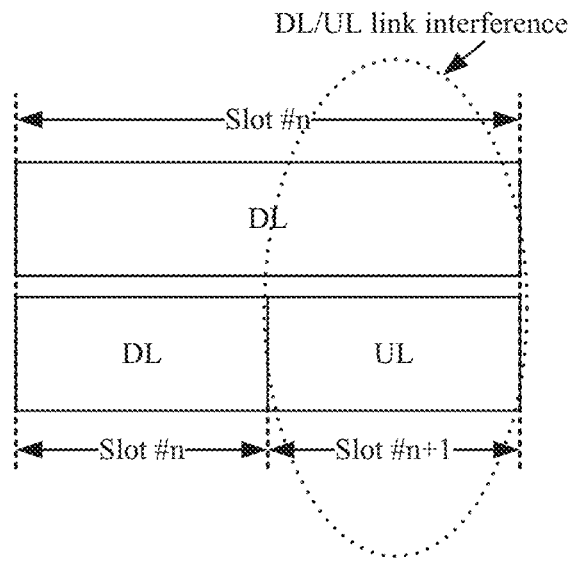
FIG. 5 is a schematic diagram of interference occurring in the case where different types of traffic using different numerology parameters according to an embodiment of the present disclosure.

In other embodiments, for the scenario 3, when apparatuses with different numerology parameters are multiplexed in the same time zone, for example, when different numerology parameters are used for the eMBB and the URLLC, control channel interference and/or data channel interference occur, as shown in FIG. 5. FIG. 5 is only for illustration and may include the following cases. When different apparatuses only perform data channel transmission in a slot #n, one of them performs uplink and/or downlink data channel transmission in the slot #n, and data channel cross-link interference occurs. In other embodiments, when different apparatuses perform not only data channel transmission but also control channel transmission in the slot #n, control channel interference may occur. In addition, if different apparatuses use different transmission directions on the data channel, data channel interference also occurs.

Figure 6:
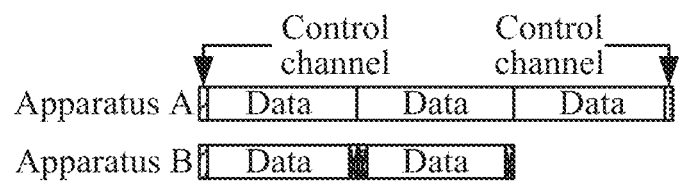
FIG. 6 is a schematic diagram of cross-link interference occurring in the case of continuous transmission of different apparatuses according to an embodiment of the present disclosure.

In a scenario 4, an apparatus performs transmission continuously in y time zones, and an adjacent apparatus performs transmission in x time zones. In this case, different apparatuses are in a multiplexing manner, and data channel interference and/or control channel interference occur. x and y are positive integers greater than and/or equal to 1. As shown in FIG. 6, an apparatus A occupies three time intervals, an apparatus B occupies two time intervals, and each time interval has the control channel transmission. At this time, when the apparatus A performs transmission in three consecutive time intervals, the data channel and/or the control channel of the apparatus B may be affected, and thereby control channel interference and/or data channel interference problems are generated. If different apparatuses have different transmission directions on the data channel, data channel interference may occur. In the case where the time interval or a time zone comprised of multiple time intervals not only has the data channel transmission but also has the control channel transmission, if the control channel positions of different apparatuses are not aligned, control channel interference may occur.

Based on cross-link interference (where cross-link interference includes: data channel and/or control channel interference) analyses and problems in different scenarios, the present disclosure provides a method for reducing or weakening control channel interference and/or data channel interference. The methods are described below.

For a method 1, a method for aligning control channel positions is provided. Preferably, the position of the fixed control channel may be statically or semi-statically configured.

Figure 7:
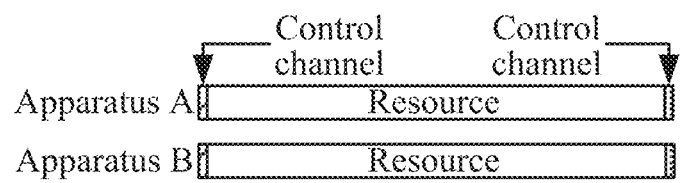
FIG. 7 is a schematic diagram of alignment of control channel positions according to an embodiment of the present disclosure.

As shown in FIG. 7, the control channels of different nodes are aligned. The nodes may belong to the same operator or belong to different operators, or in the homogeneous system/heterogeneous system.

As can be seen from FIG. 7, the apparatuses may use fixed control channels or alignment of (all or part of) the control channel positions, which can reduce or weaken control channel interference to some extent. Meanwhile, it is also ensured to some extent that important control signaling may be sent on the above fixed control channel, thereby reducing the problem of missing important control information. However, this method has a problem. When it needs to transmit a control channel on the resource between the control channels, the problem of control channel interference on the dynamic resource and/or the problem of cross-link interference caused by different data channel directions need to be further solved.

In other embodiments, relatively important control information is transmitted at the position of the fixed control channel and the relatively important control information may include a length of continuous occupation time, a time domain structure (which may be a time domain structure between two control channels), a clear channel assessment (CCA) position, a CCA type, time domain and/or frequency domain resources occupied by the CCA, scheduling information (e.g., uplink, downlink, MCS, a modulation mode, a HARQ ID, a RV version, or a transport block (TB) size), HARQ/scheduling timing, a control channel position, time domain resources and/or frequency domain resources of the control channel, and time domain resources and/or frequency domain resources occupied by the data channel. In other embodiments, the gap between fixed control channels is relatively long.

In other embodiments, the fixed control channel method may be extended to a fixed resource method. Data, and/or reference signals, and/or control channels, and/or PRACH channels, and the like may be transmitted on the fixed resources.

For a method 2, a sensing method is used for reducing control channel interference and/or data channel interference.

For a method 3, a coordination method is used for reducing control channel interference and/or data channel interference.

For a method 4, resources are reserved for the control channel for reducing control channel interference and/or data channel interference.

For a method 5, a two-steps solution or a multi-steps solution is used for reducing control channel interference and/or data channel interference. A main idea of the two-steps solution or the multi-steps solution is to gradually determine an attribute and/or a structure of a resource by each step.

The two-steps method includes indicating the control channel position and/or the data channel position in the first step, and then sending the second-level indication information through the control channel determined in the first step. For example, the second-level indication information includes a time length of the transmission, and/or a reserved structure between fixed control channels, and/or a control channel position, and/or uplink scheduling information, and/or downlink scheduling information, and/or modulation coding, and/or a CCA type, and/or a CCA position, HARQ/scheduling timing, and the like.

The methods and/or combination solutions above will be described in detail in the embodiments below.

Embodiment 3

The embodiment provides a resource alignment (which may also be referred to as resource fixation) method. The resource may include at least one of: a control channel, a data channel, a reference signal, system information, PRACH-related information, or the like. The reference signal includes one of: a CRS, a DMRS, a MBSFN reference signal, a PRS, a DRS, or a SRS. The system message includes at least one of: a MIB, a SIB, a PBCH, or the like. The PRACH-related information includes at least one of: Preamble, Msg1, Msg2, Msg3, or Msg4. Information transmitted on a particular resource is protected from interference or the impact of interference is reduced by aligning particular resources of apparatuses.

The resource in the resource alignment method in the embodiment may be predefined, or semi-statically configured through higher-layer radio resource control (RRC) signaling, or dynamically indicated by physical layer downlink control information (DCI). In other embodiments, the positions of the fixed resources may form a particular pattern in the time domain.

Figure 8:
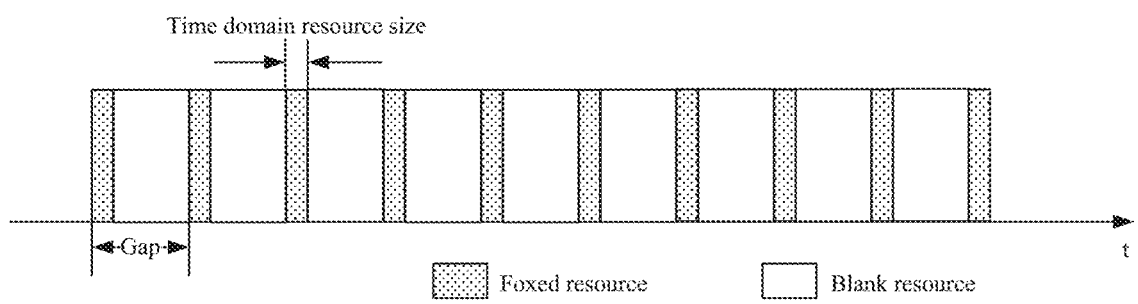
FIG. 8 is a schematic diagram showing resources having a same size and a same gap according to an embodiment of the present disclosure.
Figure 9:
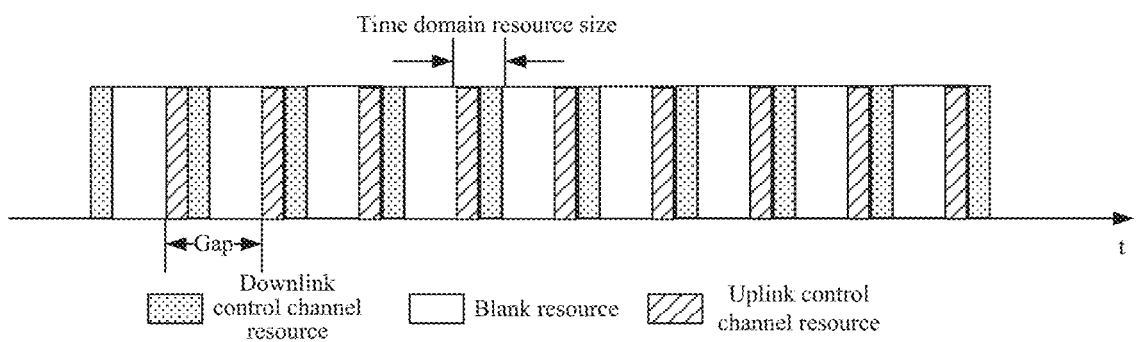
FIG. 9 is a schematic diagram of a fixed uplink control channel and a fixed downlink control channel according to an embodiment of the present disclosure.
Figure 10:
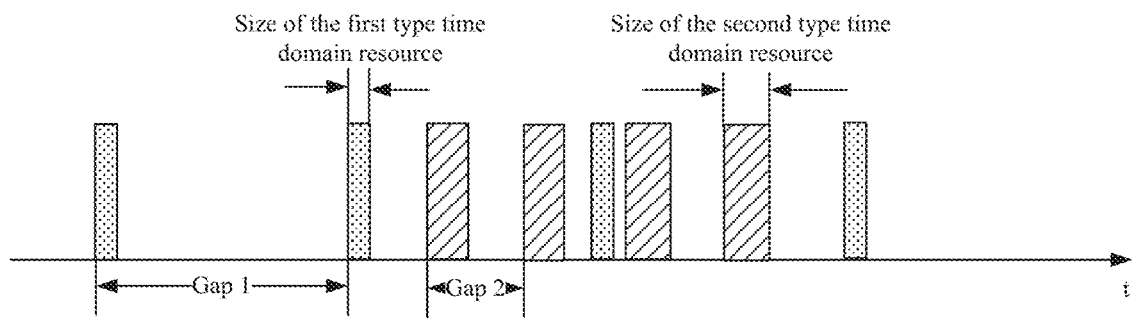
FIG. 10 is a schematic diagram showing positions of resources having two different sizes and/or having gaps of two different sizes according to an embodiment of the present disclosure.

In other embodiments, the resource pattern or the resource position may be determined by at least one of the following parameters: a starting position, an offset, a gap, a period T, a size of a time domain resource, or the number of frequency domain resources. The starting position, the offset, the gap, or the period T may be for time domain and/or frequency domain. In the time domain, the granularity of the starting position, the offset, the gap, or the period T may be an OFDM symbol, or a slot, or a mini-slot, or a subframe, or a radio frame, or a transmission period, or a sharing period, or a transmission unit, or a time zone. In the frequency domain, the granularity of the starting position, the offset, the gap, or the period T may be a RE, or a RB, or a RBG, or a subband. The offset may be a time domain resource amount or a frequency domain resource amount. The size of the time domain resource is resources occupied by aligned resources of different apparatuses. A few typical resource patterns are listed below. FIG. 8 is a schematic diagram showing resources with the same size and spaced apart equally. FIG. 9 is a schematic diagram of a fixed uplink control channel and a fixed downlink control channel. FIG. 10 is a schematic diagram of positions of resources having two different sizes and/or having gaps of two different sizes.

In other embodiments, the gap between different resources may be relatively large. In other embodiments, the resource, or the resource pattern, and/or parameters used for constituting the resource pattern, and/or an index number of the resource pattern, and/or a resource usage may be obtained by at least one of: predefined, or semi-statically configured through higher-layer radio resource control (RRC) signaling, or dynamically indicated by physical layer downlink control information (DCI). The index number of the resource pattern is predefining a resource pattern set and labeling each resource pattern in the set with a reference number. The apparatus may know which resources are fixed and available according to the obtained resource pattern reference number. The resource usage is used for determining information or a type of information that can be sent on configured fixed resource. The information may be at least one of: a control channel, a data channel, a reference signal, system information, PRACH-related information, and the like.

The control channel position and/or the data channel position are further determined in one of the following manners.

Manner 1: The control channel position and/or the data channel position is a particular position in a time interval or in a time zone.

The time interval or the time zone may be at least one of: a radio frame, a subframe, a slot, a mini-slot, a scheduling unit, a zone composed of x OFDM symbols, or a zone composed of one of y above types. The particular position is the beginning, or the end, or the position of the offset of the time interval or the time zone.

Manner 2: The control channel position and/or the data channel position are determined through a parameter. The parameter includes at least one of: an offset, a gap, a period T, a time domain length, or the number of frequency domain resources. The control channel position and/or the data channel position, or the control channel pattern and/or the data channel pattern may be determined through at least one of these parameters.

The offset, or the gap, or the period T may be the time domain and/or the frequency domain. In the time domain, the granularity of the offset, or the gap, or the period T may be an OFDM symbol, or a slot, or a mini-slot, or a subframe, or a radio frame, or a transmission period, or a sharing period, or a transmission unit, or a time zone. In the frequency domain, the granularity of the offset, the gap, or the period T may be a RE, or a RB, or a RBG, or a subband. The offset may be relative to a time domain resource amount or a frequency domain resource amount. The time domain length may be the number of resources occupied by the control channel and/or the data channel.

Manner 3: Control information and/or data are transmitted at particular positions in the time window.

Figure 11:
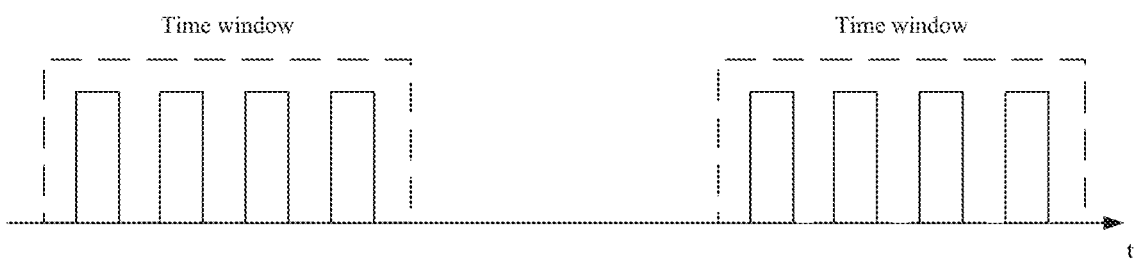
FIG. 11 is a schematic diagram of discrete resources in an aligned or fixed time window according to an embodiment of the present disclosure.
Figure 12:
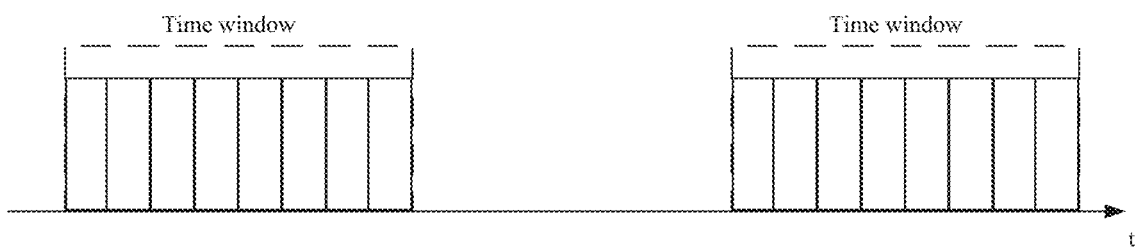
FIG. 12 is a schematic diagram of continuous resources in an aligned or fixed time window according to an embodiment of the present disclosure.

Resources in the time window may be used for transmitting the control information and/or the data. The resources used for transmitting the control information and/or the data in the time window may be continuous or discrete. The resources may be fixed positions or positions determined based on a measurement or sensing result. The resources in the time window may be determined by at least one of the following parameters: an offset, a gap, a period, a size of a resource, or the number of resources. Different apparatuses or apparatuses which belong to different operators are configured with the same position or different positions in the time window. Similarly, different apparatuses (macro eNBs, small cell eNBs, or UEs) under the same operator, or apparatuses (macro eNBs, small cell eNBs, or UEs) under different operators may be configured with the same time window position. FIG. 11 is a schematic diagram of discrete resources in an aligned or fixed time window, and FIG. 12 is a schematic diagram of continuous resources in an aligned or fixed time window.

Manner 4: A bitmap is used to determine a resource and/or position of the control channel and/or the data channel.

For example, a bitmap indication is 101010, 1 represents the position of the control channel and/or the position of the data channel, and 0 represents a position where there is no control channel and/or data channel. In other embodiments, 0 may also be used for representing the number of resources of the position where there is no control channel and/or data channel. 0 at different positions may represent different indications of the number of resources of the position where there is no control channel and/or data channel. The resource may be an OFDM symbol, or a slot, or a mini-slot, or a subframe, or a radio frame, or a transmission period, or a sharing period, or a transmission unit, or a time zone.

The resource (time domain and/or frequency domain) and/or position of the control channel and/or the data channel, or parameters constituting the resource (time domain and/or frequency domain) and/or position of the control channel and/or the data channel, or the time window, or parameters constituting the resource (time domain and/or frequency domain) and/or position of the control channel and/or the data channel in the time window, or the bitmap, or other information may be determined in a manner of semi-static configuration or static configuration.

The static configuration may be predefined, or pre-agreed between sites, or agreed in advance between UEs, or agreed between a site and a UE.

The semi-static configuration may be the higher-layer RRC signaling configuration. That is, the positions of the fixed control channel and/or data channel are adjusted once after a period of time.

The positions of the fixed control channel and/or the data channel, and/or the time domain pattern and/or frequency domain pattern of the control channel and/or data channel may be a cell-specific, or UE-specific, or group-specific, or common.

In other embodiments, the fixed control channel position and/or the fixed data channel position method is described in detail through different scenarios or different traffic types and the like.

How to use the fixed control channel and/or the fixed control channel position method between different cells under a same base station and under a same operator in order to solve control channel interference and/or data channel interference is provided. That is, the base station may broadcast the position information of the fixed control channel and/or data channel to the cells belonging to the base station. Alternatively, different cells may exchange or notify, via the X2 interface or in the over to air (OTA) manner, the positions of the fixed control channel and/or data channel, or parameters constituting the positions of the control channel and/or the data channel, or time window information and/or parameters for sending control information and/or data channels.

How to use the fixed control channel and/or the fixed control channel position method between different base stations under a same operator in order to solve control channel interference and/or data channel interference is provided. That is, different base stations send position information of the fixed control channel and data channel to surrounding base stations via the X2 interface or in the OTA manner. In other embodiments, priorities of base stations or the priority of the traffic may be defined to determine positions of the control channel and/or the data channel.

For different operators, different positions of the control channel and/or the data channel, and/or time domain patterns and/or frequency domain patterns of the data channel may be configured. In other embodiments, a CCA detection or a signal detection may be performed prior to transmission at the fixed control channel position to determine whether a channel is available.

For the UE, the position of the fixed uplink control channel, and/or the time domain pattern or frequency domain pattern of the control channel, and/or the position of the data channel, and/or the time domain pattern and/or frequency domain pattern of the data channel may be indicated by the base station through the physical layer DCI signaling, or agreed in advance by the base station and the UE, or predefined, or configured through higher-layer RRC signaling for acquisition.

In other embodiments, if the transmission apparatus performs continuous transmission, the encountered resources of the fixed control channel and/or data channel may be blanked, or the positions of the fixed control channel and/or data channel are muting, or control information may be sent, and/or data in the same direction as the fixed data channel resource is sent at the data channel position, or a CCA detection or interference measurement may be performed at the positions of the fixed control channel and/or data channel.

Embodiment 4

The embodiment provides a method of canceling and avoiding interference of the control channel and the data channel through a sensing method.

The sensing method mainly includes one of the methods described below.

For a method 1, the sensing is based on energy.

The energy-based sensing method is as follows. The apparatus performs particular operation on the energy of the signal received from a surrounding apparatus in a certain period of time to obtain a value and compares the value with a threshold value to determine whether the current channel is idle. The particular operation may be accumulation, or accumulation and multiplication by a factor. For beamforming, the factor may be the transmission beam weight of the (sensing-execution) apparatus or the reception beam weight of the apparatus. One or more threshold values may be provided. The threshold value may be predefined, or negotiated between apparatuses, or configured through higher-layer RRC signaling, or indicated through physical layer DCI signaling.

In other embodiments, the method for determining whether a channel is idle based on the energy-based sensing method includes one of the following:

1̂ A channel is considered to be busy in response to determining that the detected/sensed energy is greater than the first threshold value. On the contrary, the channel is considered to be idle in response to determining that the detected/sensed energy is less than and/or equal to the first threshold value.

2̂ A channel is considered to be idle in response to determining that the detected/sensed energy is greater than the first threshold value, and that in other embodiments, the detected/sensed energy is less than the second threshold value. In this case, the current channel may be occupied by apparatuses in the same system or in the same cell, so the current channel can be multiplexed for transmission. On the contrary, the channel is considered to be idle in response to determining that the detected/sensed energy is less than the first threshold value. Similarly, the channel is considered to be busy or not available in response to determining that the detected/sensed energy is greater than the second threshold value.

For a method 2, the sensing is based on signal detection. When the channel sensing/detection is performed, a sensing apparatus may detect channels and/or signals sent by other apparatuses. The sensing or detecting apparatus uses the channel and/or the signal to determine whether the channel is available, or whether it is uplink or downlink information, or whether it is orthogonal multiple access, or whether it is intra-frequency or inter-frequency, or whether it belongs to the same system. The purpose is to determine whether the signal is transmitted by the same cell, or an apparatus in the same system, or an apparatus under the same operator.

In other embodiments, different cells under the same system, or the same operator, or the same base station may be configured with the same channel and/or signal for detection, or may also be configured with the same signal and/or the channel pattern. The pattern is sparse in the frequency domain. The signal may be a preamble or a reference signal (which may refer to description in the previous embodiment). The channel may be a control channel and/or a physical layer shared channel or the like.

For a method 3, a method combining the energy sensing and the signal detection is provided. For example, the energy of the signal is detected through the energy sensing and is greater than the set threshold value, and then the apparatus may further determine whether the current channel is available by using the signal identification method. The signal identification may be performed by parsing the received signal or by using the time domain and/or frequency domain pattern of the received signal.

The sensing method is used to solve or reduce problems of control channel interference and/or data channel interference in various scenarios described in the embodiment 2.

For the scenario 1 shown in FIG. 1, the apparatus performs an energy sensing operation before the actually resource transmission, and if the sensed signal energy is less than and/or equal to the first threshold value, the channel is considered to be idle. Based on this, the apparatus may occupy the channel to perform transmission, and the time domain transmission structure of the transmission period may be determined by the apparatus according to the traffic requirement and/or interference measurement indication information. The interference measurement indication may be an indication of high interference, or an indication of overload or the like. A channel is considered available if the sensed signal energy is greater than or is greater than or equal to the first threshold value but is less than or is less than or equal to the second threshold value. The available channel in this case means that the channel interference is large but is within a certain allowable interference range, and it may be considered that an apparatus in the same system or under the same operator is using the channel. If the sensed signal energy is greater than or is greater than or equal to the second threshold value, the channel is considered to be busy (not for transmission).

In other embodiments, the apparatus directly performs transmission on the resource after the apparatus senses that the channel is idle, or In other embodiments, after the apparatus senses that the channel is idle, the apparatus may first send some sensing signals, and apparatuses in the same system, or under the same operator, or in different cells of the same base station identify the signal. In addition, the actual transmission may be performed after the sensing signals are sent. The signals to be sensed are sparse in a pattern in the frequency domain, and/or the sensing signals sent by different apparatuses in the same system or under the same operator are aligned in patterns in the frequency domain.

Based on this, in order to allow the apparatus to perform sensing before transmission, a particular resource needs to be reserved or blanked. Preferably, the starting position and/or time domain length of the particular resource, and/or the size of the particular resource, or the offset between the actual transmission and the particular resource may be indicated through higher-layer RRC signaling, or indicated through the physical layer DCI signaling, or predefined, or implicitly determined. The implicit determination is determination through the time domain length and/or size of the particular resource and actual transmission position. In other embodiments, a position of the particular resource may be fixed, and/or may be dynamically changed according to the uplink traffic requirement and downlink traffic requirement. The particular resource may include j OFDM symbols, or has a length less than one OFDM symbol. j is a positive integer greater than and/or equal to 1.

At least one of the cases 1 to 3 in the scenario 2 corresponds to FIGS. 2 to 4. As can be seen from the figures, in the same time zone, an apparatus transmits a control channel, another apparatus transmits a data channel, so a control channel interference problem is caused. Preferably, in the same time, positions of the sensing operations performed by different apparatuses for sending the control channels and for sending the data channels are different. In addition, the reliability requirements for the control channel are relatively high, and therefore the control channel has a higher priority than the data channel.

Based on this, in order to reduce interference, one of the manners described below may be performed.

Manner 1: A sensing operation is performed before actual transmission. The sensing method is the same as the method described in this embodiment.

Manner 2: Sensing is performed before actual transmission. If the channel is sensed to be idle, the actual transmission is performed directly. Alternatively, after the channel is detected to be idle, the apparatus informs the surrounding apparatuses of the duration the apparatus occupies the channel, and/or the used numerology parameter, and/or a time domain transmission structure and/or frequency domain transmission structure in the channel occupancy time, and/or an attribute of a resource in the transmission structure. Alternatively, after the channel is detected to be idle, an indication signal is sent.

Manner 3: Sensing signals or indication signals are forcibly sent before the actual transmission. The sensing signals are sparse in the frequency domain, and/or the patterns of the sensing signals sent by different apparatuses in the same system or under the same operator are aligned in the frequency domain.

In other embodiments, in order to further avoid interference, in a same period of time, an apparatus transmits the control channel, and another apparatus transmits the data channel, and the control channel and the data channel may be configured with different sensing positions. As illustrated in at least one of FIGS. 2 to 4, a blank resource for performing control channel sensing is placed before the control channel position, and the sensing of the data channel may be performed in all or part of an overlapping area of the data channel and the control channel.

In other embodiments, if a data channel of an apparatus is aligned, coincides, or interferes with the control channel position of another apparatus in the transmission period, the apparatus may vacate or blank the overlapping resource of the data channel and the control channel. Alternatively, the apparatus may reduce the transmitting power. Alternatively, the apparatus determines, according to the priorities, whether to avoid transmission of the data channel or reduce the transmitting power of the data channel or to prevent the apparatus from transmitting the control channel. The priorities may be priorities of different traffic types, or priorities of different apparatuses, or priorities of different signals/channels. In other embodiments, the apparatus that transmits data needs to perform sensing on or before the overlapping position of the control channel and the data channel Preferably, the threshold value used for performing the sensing by the apparatus that transmits the data channel is different from the threshold value used for performing the sensing by the apparatus that transmits the control channel. Alternatively, the apparatus transmitting data sends an indication signal or a notification in advance for notifying the surrounding apparatus of the data transmission in a certain time zone. Alternatively, the apparatus transmitting data exchanges, with the surrounding apparatus, information about the time domain transmission structure in a period of time and/or an attribute of a resource in the transmission structure and the like, so as to know whether the interference is generated, and then perform coordination to reduce the interference opportunity.

For the scenario 3, FIG. 5 shows the multiplexing of apparatuses with different numerology parameters. A typical scenario is multiplexing of the URLLC traffic and the eMBB traffic. When there is transmission need, the URLLC traffic is directly transmitted. Before the eMBB traffic is transmitted, a sensing operation needs to be performed or a resource position sent by the URLLC needs to be blanked. The eMBB may identify a signal sent by a URLLC apparatus. Preferably, the apparatus may send a particular signal according to the same numerology parameter before actual transmission, and the particular signal is identified by other apparatuses. In actual and effective transmission, the apparatus may perform transmission according to its own numerology parameter.

In the dynamic TDD system, the uplink traffic amount and the downlink traffic amount are dynamically changing, this feature may cause that different apparatus perform transmission simultaneously on the same frequency band, resulting in control channel interference and/or data channel interference. Based on this, in the NR frame structure, a particular resource needs to be reserved or blanked before the resource position of the data channel and/or the resource position of the control channel. The particular resource may be used by the apparatus to perform interference measurement or channel busy-idle state sensing before transmitting the control channel and/or data channel. The interference measurement is to measure the level of interference around. The interference measurement may be performed on a reference signal receiving power (RSRP), or a received signal strength indication (RSSI), or a DMRS or the like. In other embodiments, the base station and/or the UE may determine whether the channel can be used for transmission according to an interference overload indication or a high interference indication.

In other embodiments, the interference status of the channel is detected by using the sensing method. The sensing method includes: determining an interference source through a clear channel assessment (CCA) detection or through signal identification, for example, determining whether the interference is from the same system or whether the interference is from the same operator.

The particular resource (which may be a time domain resource and/or a frequency domain resource), a starting position and/or end position of the particular resource, and/or a size of the resource, and/or a time domain position and/or frequency domain position at which sensing or interference measurement is performed may be indicated through physical layer DCI signaling, or indicated through higher-layer RRC signaling, or predefined, and/or agreed by the base station and the UE in advance.

In other embodiments, the sensing position or the signal used for interference identification may be cell-specific, or UE-specific, or group-specific, or common. The particular resource may be: a mini-OFDM symbol (which may be understood as having a shorter length than an OFDM symbol), or an OFDM symbol, or a slot, or a mini-slot, or a subframe, or a combination thereof. The slot or the mini-slot is a positive integer not greater than a particular value. The particular value may be indicated through the physical layer DCI signaling, or indicated through the higher-layer RRC signaling, or predefined, or agreed in advance by the base station and the UE. Preferably, the particular value may be 1, 2, 3, 4, 5, 6, 7, 8, 9, 10, and the like.

In other embodiments, apparatuses belonging to the same operator may be configured with the same time domain position and/or frequency domain position for sensing. Different operators or apparatuses belonging to different operators are configured with different time domain positions and/or frequency domain positions for sensing.

In other embodiments, the apparatus sends an indication signal/indication information in response to determining that a channel is detected to be idle at the time domain position and/or frequency domain position for sensing. The indication signal/information is used for notifying the surrounding apparatus of the channel occupation status. The indication information may include at least one of: the channel occupation duration, a time domain structure, a control channel position, and whether to transmit an occupancy signal or a reservation signal at the time domain position and/or frequency domain position for sensing.

In other embodiments, the apparatus that performs transmission may perform sensing, or transmit an occupancy signal or a reservation signal, or perform no operation, or blank or mute the sensing resource at the time domain position and/or frequency domain position.

In other embodiments, in a case where the time domain position and/or frequency domain position for sensing is not configured, the apparatus performs a sensing operation when having traffic needs, or a scheduling request, or the like. The apparatus may perform the sensing operation before sending any signal and/or channel.

Embodiment 5

The embodiment provides a coordination method to achieve interference cancellation and interference avoidance.

Control channel interference and/or data channel interference is canceled or prevented by coordination between apparatuses. The coordination method or process is as follows.

An apparatus in preparation for performing transmission notifies the surrounding apparatus of the numerology parameter, and/or the time domain structure of the transmission, and/or the starting position of the transmission, and/or the end position of the transmission, and/or the channel occupation duration, and/or the fixed resource position, and/or the gap between fixed resources, and/or the pattern index of the fixed resource, and/or the index of the transmission time domain structure, and/or sensing position information (e.g., the starting position, the duration, and the end position of the sensing execution, the interval between the sensing resources), the interference measurement information and the like.

In other embodiments, the surrounding apparatus receives the information notified by the transmitting apparatus, and may coordinate or adjust its own transmission process according to these information. For example, the surrounding apparatus adjusts the transmitting power. Alternatively, according to the transmission information of the transmitting apparatus, the surrounding apparatus adjusts its own transmission channel type and/or transmission direction (that is, the information and/or signals and/or channels transmitted on the same resource have a same type and/or a same transmission direction) on the collision or interference resource. The information type includes: a control channel, a data channel, system information, and a reference signal. The transmission direction includes: uplink, downlink, mixing of uplink and downlink; or the resource that interferes or conflicts with the transmitting apparatus is blanked. Preferably, the apparatus interfering the transmitting apparatus greatly may use the above adjustment or coordination solution.

Alternatively, the surrounding apparatus receives the information from the transmitting apparatus, and may not do any processing. In other embodiments, the sensing operation is performed before transmission. The purpose is to reduce interference between apparatuses.

In other embodiments, different apparatuses, and/or different traffic, and/or different channels, and/or different signals have the same contention priority or different priorities at flexible resource positions.

In other embodiments, information of resources that need to be aligned may be determined through negotiation between different apparatuses. The advantage is that the probability of interfering important information may be reduced to some extent. For the resource not determined through negotiation, different apparatuses may contend for the use right fairly, for example, by implementing the sensing solution. Alternatively, different apparatuses determine whether a current resource or a resource within a period of time can be used through the interference measurement.

In other embodiments, interference measurement and/or relevant-information interaction may be performed periodically between different apparatuses, and/or information interaction and/or interference measurement may be performed through trigger conditions.

In other embodiments, resources for performing information interaction and/or for performing interference measurement may be predefined, or configured through physical layer DCI signaling, or configured through higher-layer RRC signaling, or determined through negotiation between apparatuses, and/or negotiated or agreed by the base station and the UE.

In other embodiments, the interference measurement may be performed by the base station side and/or may also be performed by the UE.

In the embodiment, different base stations, or different operators, or different cells under the same base station, or different UEs negotiate the control channel position and/or the data channel position, and thereby the purpose of reducing or solving the problem of the control channel position interference and the data channel interference is achieved.

In other embodiments, the priorities, or the numerology, and/or the time domain resources, and/or the frequency domain resources, and/or the spatial domain resources (beam direction, etc.), and/or the code domain resources (e.g., the sequence number and/or cyclic shift, etc.), the control channel position, or the data channel direction (uplink, downlink, or a mixed type (including at least one of: uplink, downlink, gap, uplink control or downlink control)), or a transmission signal type may be negotiated. The priorities may be priorities of different traffic, or priorities of different base stations, or priorities of different operators, or priorities of different channels and/or signals, or priorities of different systems (e.g., LTE, NR, Wi-Fi, D2D, V2X, etc.).

In other embodiments, if different types of traffic (e.g., eMBB, URLLC, and mMTC), or different types of signals/ channels, or different types of transmission signals, or different systems are transmitted on the same resource, an occupancy status of the resource may be determined according to their priority levels. In other embodiments, the sensing operation may be performed, and different priorities correspond to different listen before talk (LBT) types, or different LBT parameter sets, or different occupation durations, or different beam directions (different beam directions corresponding to different channel states), or different time domain resource structures and/or frequency domain resource structures. With priorities from high to low, the configured contention windows become larger, and/or the random backoff values become larger, and/or the parameters m of the delay periods become larger, and/or the occupation durations become smaller or are small, and/or the beam direction is not good, and/or the time and/or frequency domain resource structure is highly or slightly flexible.

In other embodiments, the interference status may be determined according to radio resource management (RRM) measurement, or channel state information-interference measurement (CSI-IM), or the DMRS, or the RSRP, or the RSSI measurement result, or the CCA detection result, and thereby the control channel position, and/or the data channel position are coordinated.

Embodiment 6

The embodiment provides a method of canceling and avoiding interference by reserving resources.

The resource reservation method is to reserve or to mute particular resources for transmitting the control information, and/or particular system information, or data. The reserved resources may be fixed or dynamically variable. The fixed manner of reserving resources may be determined through predefinition.

The manner of dynamically determining reserved resources may be indicated through physical layer DCI signaling or higher-layer RRC signaling. The control information and/or the particular system information or the data may be configured with different reserved resource positions, or the information type on the reserved resources is not limited. The control information includes: uplink control information (e.g., ACK/NACK, and the like), and downlink control information (uplink or downlink grant, scheduling information, and the like). The system message includes: the MIB, the SIB, the PRACH, the DRS, and the like.

In other embodiments, the reserved resource information may be exchanged or shared between base stations, or between UEs, or between a base station and a UE.

Embodiment 7

The embodiment provides a two-steps method or a multi-steps method to achieve data channel interference cancellation and/or control channel interference cancellation.

The two-steps method is used for describing the solution.

In the first step, the first-level resource is obtained through the first-level indication information. The first-level indication information may be higher-layer RRC signaling, or physical layer DCI signaling, or a predefinition manner. The first-level resource may be dynamically configured, or statically or semi-statically adjusted. In other embodiments, the first-level resource may be a single resource or a plurality of resources. The plurality of resources constitute a resource pattern, and the resource pattern is the first-level resource. The first-level resource may be used for transmitting at least one of: a control channel, a data channel, a reference signal, system information, PRACH-related information, and the like. The reference signal includes one of: a CRS, a DMRS, a MBSFN reference signal, a PRS, a DRS, and a SRS. The system message includes at least one of: a MIB, a SIB, a PBCH, and the like. The PRACH-related information includes at least one of: Preamble, Msg1, Msg2, Msg3, or Msg4.

In the second step, through the second-level indication information, resources between the first-level resources or resources other than the first-level resources are indicated or adjusted. Alternatively, through the second-level indication information, a transmission structure of the resources other than the first-level resources in a certain time zone after the indication information, and/or position information of the second-level resource among the resources, and/or position information of the resources for performing the sensing operation, and/or position information of the resources for performing interference measurement, and/or scheduling/HARQ timing information, and/or uplink scheduling information, and/or downlink scheduling information is indicated or adjusted. The transmission structure of the resource among the resources includes: a data channel position, or a control channel position, or a sensing position, or various combinations thereof. The combined structure may include at least one of: a data channel position, a control channel position, or a sensing position. A transmission structure may include one or more data channel resources and/or one or more control channel resources, and/or one or more sensing resources, and/or various combinations thereof. In other embodiments, the transmission direction of resources at the data channel position may be fixed, or may be unfixed, i.e., may be dynamically variable, or uplink and/or downlink transmission attributes may not be performed. The data channel may be: an uplink data channel or a downlink data channel. The control channel may be: an uplink control channel or a downlink control channel.

In other embodiments, the multi-steps solution may be understood as that a previous level of information indicates or adjusts resources between the previous level of resources or resources other than the previous level of resources, or indicates a transmission structure of the dynamic resource other than the previous level of resources in a certain time zone after the information, and/or position information of the next level of resource among the resources, and/or position information of a resource for performing the sensing operation, and/or position information of a resource for performing interference measurement, and/or scheduling/HARQ timing information, and/or uplink scheduling information, and/or downlink scheduling information.

In other embodiments, for each level of resources, specific and particular information may be sent on the resources. Or the transmission structure on the resources, and/or position information of a particular resource among the resources, and/or position information of a resource for performing the sensing operation, and/or position information of a resource for performing interference measurement, and/or scheduling/HARQ timing information, and/or uplink scheduling information, and/or downlink scheduling information may be determined according to a particular rule.

The two-steps solution will be exemplified below, and the multi-steps solution may be obtained by analogy according to the two-steps solution.

Figure 13:
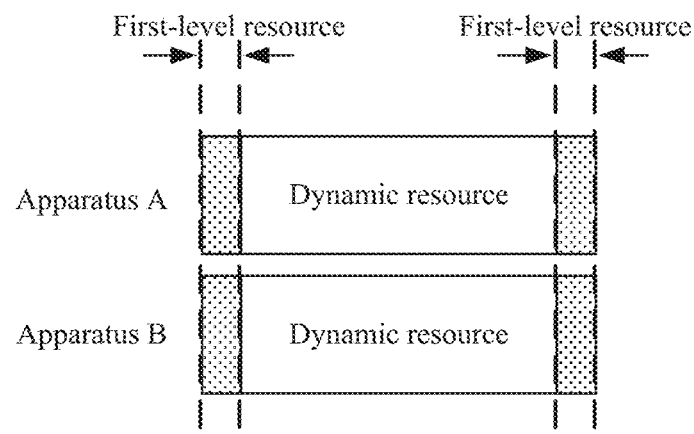
FIG. 13 is a schematic diagram showing that first-level resources of different apparatuses are aligned according to an embodiment of the present disclosure.

Example 1 (in which the determining process of the first-level resource and/or the processing manner in the case where the first-level resources of different apparatuses are not aligned are mainly introduced) is as follows. The first-level indication information indicates the first-level resource position information. The first-level resource position may be statically or semi-statically configured or indicated or adjusted through the first-level indication information. If the first-level resource is dedicated for transmitting the control channel/information, different apparatuses may share the first-level resource, or different apparatuses may be configured with different first-level resources or the same first-level resource. In other embodiments, when the first-level resources of different apparatuses are not aligned, the first-level resource positions which are not aligned or interfered are blanked. Or the sensing operations are performed before the first-level resource positions which are not aligned or interfered. Or the sensing operations or interference measurement are performed on part or all of the resources at the first-level resource positions which are not aligned or interfered. The above content may be as shown below. FIG. 13 is a schematic diagram of alignment of first-level resources of different apparatuses. The first-level resources are control channel resources.

Figure 14:
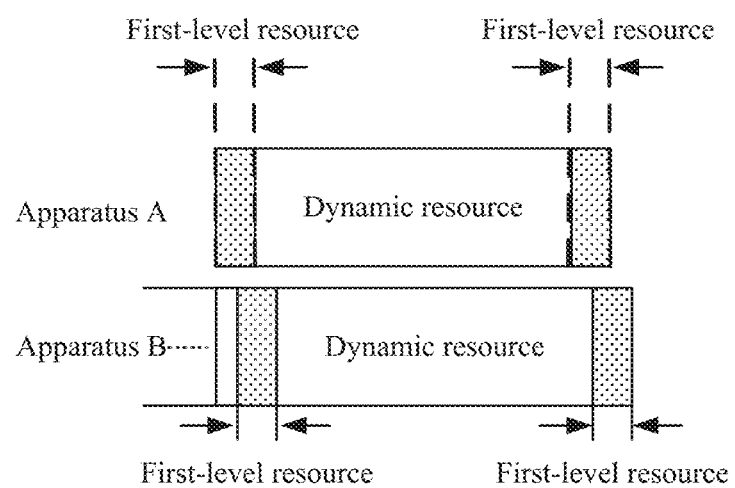
FIG. 14 is a schematic diagram showing that first-level resources of different apparatuses partially overlap according to an embodiment of the present disclosure.

FIG. 14 is a schematic diagram showing that first-level resources of different apparatuses partially overlap. For an apparatus A, control information may be directly transmitted on the first-level resource, alternatively, the sensing operation is performed before the control information is transmitted on the first-level resource, and the control information is transmitted on the first-level resource when the channel is sensed to be idle. Alternatively, the sensing operation is performed before the control information is transmitted on the first-level resource, a signal or channel for sensing (the signal/channel for sensing may be transmitted on the first-level resource, or may be transmitted between the time when the channel is sensed to be idle and the first-level resource, or may be transmitted on a resource between the time when the channel is sensed to be idle and a fixed channel position in the first-level resource position) is sent when the channel is sensed to be idle, and then the actual control channel is transmitted. Alternatively, the apparatus A blanks the resource overlapping the control channel of an apparatus B, and the apparatus B blanks the resource overlapping the control channel of the apparatus A. Alternatively, the apparatus B and the apparatus A exchange positions of the first-level resources, and align the positions of the first-level resources through adjustment. The information interaction may be performed before the earliest first-level resource time point. The resource position of the information interaction may be dynamically indicated through physical layer DCI signaling, or statically or semi-statically indicated through higher-layer RRC signaling, or indicated through predefinition. Alternatively, if the apparatus B and the apparatus A transmitted data at positions where the control channels are not aligned, the apparatus B may adjust (e.g., reduce) the transmitting power of the data channel. The apparatus A may also use the same processing manner.

Figure 15:
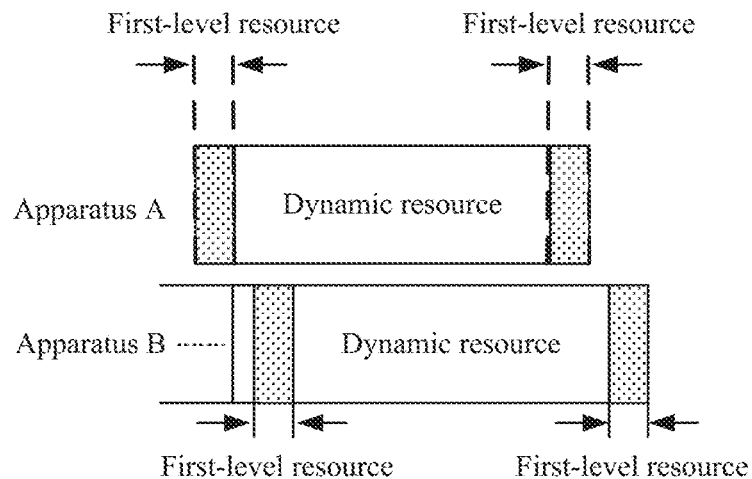
FIG. 15 is a schematic diagram showing that first-level resources of different apparatuses do not overlap according to an embodiment of the present disclosure.

FIG. 15 is a schematic diagram showing that first-level resources of different apparatuses do not overlap. The apparatus A and/or the apparatus B may directly transmit the control information on the first-level resource, alternatively, the apparatus A and/or the apparatus B performs the sensing operation before transmitting the control information on the first-level resource, and transmits the control information on the first-level resource in response to determining that the channel is sensed to be idle. Alternatively, the apparatus A and/or the apparatus B performs the sensing operation before transmitting the control information on the first-level resource, and transmits a signal or channel for sensing (the sensing signal/channel may be transmitted on the first-level resource, or the time when the channel is sensed to be idle is at the position of the first-level resource, or the time when the channel is sensed to be idle is at a resource between fixed channel positions at the position of the first-level resources) in response to determining that the channel is sensed to be idle, and then transmits the actual control channel. Alternatively, the apparatus A blanks the resource overlapping the control channel of an apparatus B, and the apparatus B blanks the resource overlapping the control channel of the apparatus A. Alternatively, the apparatus B and the apparatus A exchange positions of the first-level resources, and align the positions of the first-level resources through adjustment. The information interaction may be performed before the earliest first-level resource time point. The resource position of the information interaction may be dynamically indicated through physical layer DCI signaling, or statically or semi-statically indicated through higher-layer RRC signaling, or indicated through predefinition. Alternatively, if the apparatus B and the apparatus A transmit data at positions where the control channels are not aligned, the apparatus B may adjust (e.g., reduce) the send power of the data channel. The same processing manner is also used by the apparatus A.

Example 2: Based on the example 1, how to reduce data channel interference and/or control channel interference on resources between the first-level resources for the apparatuses or resources other than the first-level resources is further illustrated.

Figure 16:
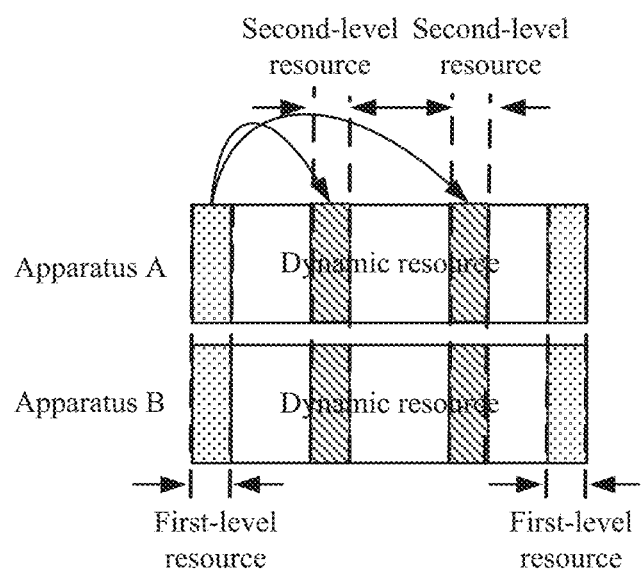
FIG. 16 is a schematic diagram of using first-level resources to indicate that second-level resources among resources between the first-level resources are position-aligned according to an embodiment of the present disclosure.
Figure 17:
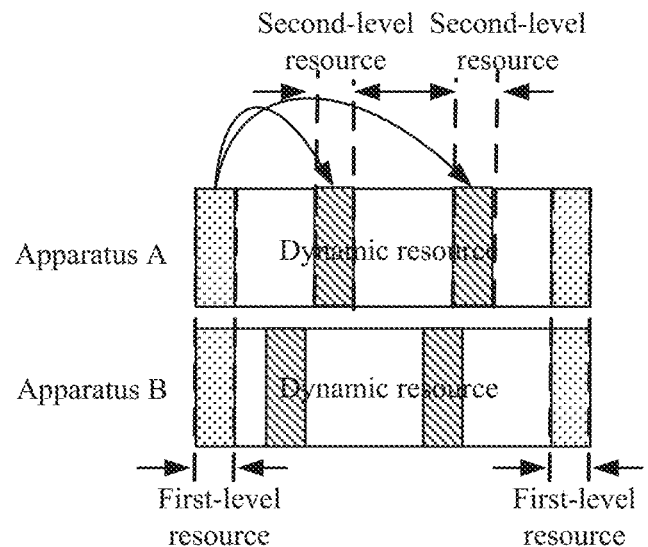
FIG. 17 is a schematic diagram of using first-level resources to indicate that second-level resources among resources between the first-level resources are not position-aligned or not completely position-aligned according to an embodiment of the present disclosure.

In the first case, control information transmitted on the control channel on the first-level resource indicates position information of the second-level resource between the first-level resources. For example, the position information may be the offset between the second-level resource and the first-level resource, and/or the gap, and/or the size of the second-level resource, and/or the scheduling/HARQ timing relationship of the second-level resource. The possible second-level indication steps will be explained below based on FIG. 13. FIG. 16 shows the second-level resource, among resources between the first-level resources, indicated by the first-level resource. For FIG. 16, the apparatus A and the apparatus B may respectively indicate a position of the second-level resource, or a position of the second-level resource pattern, or the positions of the second-level resources or the positions of the second-level resource patterns indicated by different apparatuses through the first-level resources are the same. For the former (a structure as shown in FIG. 16), the apparatus performs a sensing operation or interference measurement after the first-level resource. An apparatus sensing that the channel is idle or an apparatus measuring an interference level not greater than a threshold value can use dynamic resources. Resource attributes or transmission structures on the dynamic resources are determined by the apparatus that successfully performs sensing. Alternatively, after the first-level resource, the apparatus having a high priority, according to priorities of traffic types, or priorities of apparatuses, or priorities of channels and/or signals, has the right to use the dynamic resources. The dynamic resource may be between the first-level resource and the second-level resource, or between the first-level resources, or may be a resource between the second-level resources, or may be a resource a certain period of time after the first-level resource. In other embodiments, the apparatus may perform channel sensing or interference measurement before the second-level resource. For the latter (a structure as shown in FIG. 17), the apparatus performs a sensing operation or interference measurement after the first-level resource. An apparatus sensing that the channel is idle or an apparatus measuring an interference level not greater than a threshold value can use dynamic resources. Resource attributes or transmission structures of the dynamic resources are determined by the apparatus that successfully performs sensing. Alternatively, after the first-level resource, the apparatus having a high priority, according to priorities of traffic types, or priorities of apparatuses, or priorities of channels and/or signals, has the right to use the dynamic resources. The dynamic resource may be located between the first-level resource and the second-level resource, or between the first-level resources, or may be a resource located between the second-level resources, or may be a resource located a certain period of time after the first-level resource. In other embodiments, the apparatus may perform channel sensing or interference measurement before the second-level resource. Preferably, in the case where the second-level resources of different apparatuses are not aligned, the unaligned positions of the second-level resources may be blanked, or the sensing operations or the interference measurement are performed before the second-level resources, or the power of the transmitted signals on the aligned resources is reduced, or the second-level resource position information is exchanged between the apparatuses, and thereby the second-level resource position information is coordinated between the different apparatuses. According to the interaction information, the apparatus may not send information on the resource that conflicts or interferes with the second-level resource, or the apparatus may perform the sensing operation or the interference measurement operation on the first-level resource, and transmit the actual control channel signal on the remaining resources of the second-level resources.

In the second case, control information transmitted on the control channel on the first-level resource indicates the transmission structure, such as data channel+gap+control channel, between the first-level resources. In other embodiments, the transmission direction of the data channel may be explicitly indicated, or the transmission direction of the data channel is not indicated and only the resource that is used for data channel transmission is indicated. The transmission direction on the data channel may be obtained by performing a sensing operation before the data channel resource, or apparatuses coordinate or exchange the transmission directions (apparatuses having opposite transmission directions readjust scheduling directions or scheduling/HARQ timing relationships, MCSs, RVs, HARQ process numbers and other information), or apparatuses reduce the transmit powers, or the transmission direction of the data channel resource is determined or coordinated according to priorities (the priorities include at least one of: priorities of apparatuses, priorities of different traffic types, priorities of different channels/signals, or priorities of different operators). For apparatuses that have different transmission directions or use different transmission structure types on data channel resources, resources corresponding to different transmission directions are blanked. Alternatively, a combination of the above manners is used. In the case of explicitly indicating the transmission direction of the data channel, different apparatuses may determine the use right of data resources through sensing or through priorities. In addition, the processing mode of the control channel is the same as the processing mode of the data channel. The control channel includes an uplink control channel and a downlink control channel. In other embodiments, multiple sets of feedback information may be transmitted on the uplink control channel, and the uplink control channel is used for feeding back information only the previous transmission. Similarly, one control signaling or multiple sets of control signaling may be indicated on one uplink control channel. Information carried by the multiple sets of control signaling may be the same or different.

In other embodiments, different apparatuses may use the same transmission structure or different transmission structures. When transmissions are performed according to different transmission structures, each apparatus may inform other apparatuses of its transmission structure. Alternatively, the apparatus may perform sensing before the data channel and/or before the control channel in the transmission structure. Alternatively, the apparatus may blank data channel resources which are not aligned or blank control channel resources which are not aligned. Alternatively, the apparatus may reduce the transmitting power of unaligned data channel resources and/or unaligned control channel resources.

In other embodiments, the transmission structure may also be determined according to control information (such as a scheduling/HARQ timing relationship) transmitted on the control channel on the first-level resource.

Position information of the second-level resource may include the offset between the second-level resource and the first-level resource, and/or the gap, and/or the size of the second-level resource, and/or the scheduling/HARQ timing relationship.

Preferably, the two-steps solution is illustrated above only by taking the control channel signal transmission on the first-level resource as an example. The method of transmitting other information on the first-level resource is the same as or similar to the method described above.

Preferably, only the resource allocation status between the first-level resources is illustrated above, while the resource allocation status a period of time after the first-level resource is not illustrated.

Preferably, for the case where the data channel resources overlap, the apparatus may perform pre-coding operations on the data channel and the blanked channel respectively, and may coordinate in space domain to reduce the control channel interference to the data channel, or the data channel interference to the control channel.

In other embodiments, when a control channel is transmitted on the second-level resource, the resource allocation status on subsequent resources may be indicated through control signaling on the control channel on the second-level resource, and the method is the same as the above method in which the control channel is transmitted on the first-level resource.

In other embodiments, the first-level resource, and/or the second-level resource, and/or the kth-level resource may be a control channel resource, or may be a data channel resource. In the case the first-level resource, and/or the second-level resource, and/or the kth-level resource is the data channel resource, the transmission direction of the apparatus on the data channel may be determined by performing a sensing operation before the data channel, or by negotiation, or by priorities. For apparatuses having opposite transmission directions on the data channel, the positions of the resources causing interference may be blanked, or the transmitting power may be reduced or increased. In other embodiments, the channel use right of dynamic resources between the first-level resources, and/or between the second-level resources, and/or between the kth-level resources may also be determined through the sensing operation, or the negotiation, or the priority.

The resource may also be a reference signal, system information, and PRACH-related information in addition to the control channel resource and the data channel resource, and the processing manner is the same as the processing manner described above.

The following content may serve as supplementary information.

The general solution is to determine the position of the first-level resource in a particular manner in order to ensure that important control information or system information or data can be transmitted without interference, or to perform sensing or a CCA or measurement. The second step is to indicate, through the first-level resource, the resource allocation status in the time interval. The first-level resource may indicate the resource allocation status between the first-level resources, or indicate the resource allocation status in a particular time interval after the current first-level resource. The resource allocation status includes one of a data channel, a control channel, a gap, or a blank resource. The control channel includes an uplink control channel and a downlink control channel. The data channel includes an uplink data channel and a downlink data channel. With further extension, the interference problem can be solved by a multi-resource level solution.

The two-steps solutions in different cases are described below.

Figure 18:
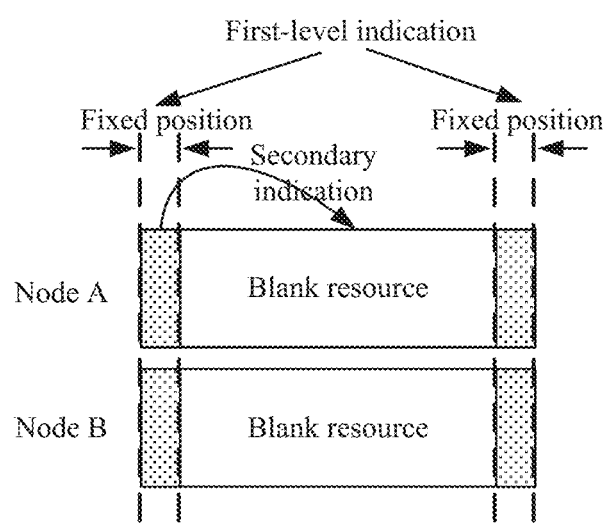
FIG. 18 is a schematic diagram of using first-level resources to indicate resource allocation between the first-level resources according to an embodiment of the present disclosure.
Figure 19:
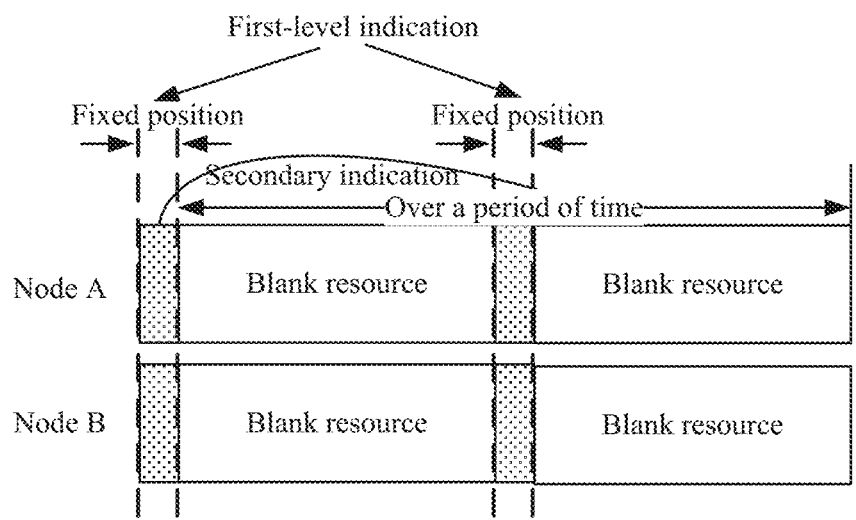
FIG. 19 is a schematic diagram of using first-level resources to indicate resource allocation in a certain period of time according to an embodiment of the present disclosure.

Manner 1: A fixed resource is configured in a static or semi-static manner, and indication information is sent on the fixed resource to indicate resource configuration between the fixed resources, as shown in FIG. 18. Alternatively, the indication information transmitted on the fixed resource indicates resource configuration in a certain period of time, as shown in FIG. 19. This is to eliminate or resolve control channel interference and/or data channel interference generated between fixed resources or on resources over a certain period of time.

1̂ When the fixed resource is a control channel position, control signaling transmitted on the control channel is used for indicating a resource allocation status of blank resources between the fixed resources.

The control signaling may be one of: DCI format 0, DCI format 0A, DCI format 0B, DCI format 1, DCI format 1A, DCI format 1B, DCI format 1C, DCI format 1D, DCI format 2, DCI format 2A, DCI format 2B, DCI format 2C, DCI format 2D, DCI format 3, DCI format 3A, DCI format 4, DCI format 4A, and DCI format 4B. The resource allocation status of the blank resources include at least one of: an uplink resource, a downlink resource, a gap, uplink control, or downlink control. In other embodiments, the blank resources may include at least one of the resource allocation statuses. In other embodiments, the gap may be used for uplink and downlink conversion, or for sensing, or for performing a CCA.

In other embodiments, the control signaling may also carry scheduling/HARQ timing information. The scheduling/HARQ timing information includes: a timing relationship k1 between the downlink control and the downlink data, and/or a timing relationship k2 between the downlink data and the uplink control, and/or a timing relationship k3 between the downlink control and the uplink data. k1, k2 and k3 each have a minimum value of 0, and each may have a maximum value which is a particular value M. M may be a positive integer such as 1, 2, 3, 4, 5, 6, 7, 8, 9, 10, etc. The granularity of the timing relationship value may be an OFDM symbol, or a slot, or a mini-slot, or a time interval, or a scheduling unit, or a subframe, or a radio frame. The time interval may be a combination of the above granularities.

In other embodiments, the control signaling may indicate a resource allocation time domain structure of a blank resource, and may also indicate resource allocation time domain structures of multiple sets of blank resources.

In other embodiments, the control signaling may indicate a time domain resource position and/or a frequency domain resource of control signaling in the blank resource. In other embodiments, if a data direction of the blank resource is indicated by the control channel at the position of the fixed resource, the data direction may be adjusted through a second-level control channel. If the data direction on the blank resource is not indicated by the control channel at the position of the fixed resource, a channel situation may be determined by performing sensing or measurement, and thereby the direction of the data resource is determined. The data direction includes: uplink or downlink. In other embodiments, another apparatus may transmit control information on the resource, or blank or mute the resource, or perform a CCA detection on the resource at the control channel position on the blank resource.

In other embodiments, the fixed resource position may be cell-specific, or UE-specific, or shared.

The above manner may also be applied to resource allocation on blank resources over a period of time.

2̂ When the fixed resource is a data channel position and/or a downlink control channel position, control signaling transmitted on the downlink control channel is used for indicating the resource allocation status of the blank resources. The resource allocation includes at least one of: a downlink control channel, an uplink control channel, a data channel, an uplink data channel, a downlink data channel, or a gap.

3̂ When the position of the fixed resource is a position for sensing channel or interference measurement, a particular resource after the fixed resource is determined to be the control channel position or the data channel position in response to determining that the channel is sensed to be idle or that the measured interference level is lower than a predetermined threshold value. In other embodiments, a scheduling status, and/or a time domain structure, or a position of a secondary control channel between fixed resources or over a period of time or within the intended transmission are indicated through the control channel.

Manner 2: The control channel position and/or the data channel position is determined based on a result of sensing execution. In other embodiments, the scheduling status, and/or the time domain structure, or the position of the secondary control channel or a data direction between the fixed resources or over a period of time or within the intended transmission are indicated through the control channel. The position at which the sensing is performed may be any time, or may be determined by the scheduling request time, or may be determined by the arrival time of a data packet.

Manner 3: The fixed channel position and/or the data channel position are adjusted in a coordinated manner. The control channel positions and/or the transmission structures are notified or exchanged on a predetermined resource between cells or between base stations or between a base station and a UE or between UEs. After the information sent the other apparatus is received, information may not be sent, or muting is kept, or a CCA detection is performed, or interference measurement is performed, or control information is sent to adjust the transmission structure of the apparatus itself at the fixed channel position of the other apparatus and thereby the control channel interference cancellation and/or the data channel interference cancellation are achieved. The predetermined resource may be a time domain resource, and/or a frequency domain resource, and/or a spatial domain resource.

The second-level indication information may indicate or adjust the time length of transmission, and/or a reserved structure between the fixed control channels, and/or a position of the second-level control channel, and/or uplink scheduling information, and/or downlink scheduling information, and/or modulation coding, and/or a CCA type, and/or a CCA position, HARQ/scheduling timing, and the like.

Based on the same inventive concept, an embodiment of the present disclosure provides an interference processing device. The device is applied to the transmission apparatus described in the above embodiments, and is used to implement the method described in one or more of the above embodiments.

Figure 20:
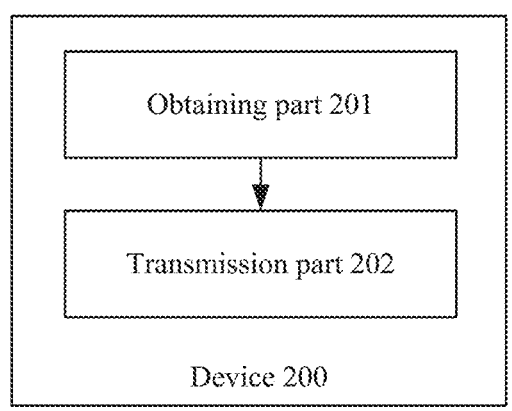
FIG. 20 is a structural diagram of an interference processing device according to an embodiment of the present disclosure.

As shown in FIG. 20, a device 200 includes: an obtaining part 201, which is configured to obtain first indication information; and a transmission part 202, which is configured to perform transmission on a particular resource according to the first indication information.

In the present disclosure, the transmission apparatus obtains the first indication information through at least one of: predefinition, physical layer downlink control information (DCI) signaling, higher-layer radio resource control (RRC) signaling, an X2 interface, or an air interface.

In the present disclosure, the first indication information includes at least one of: uplink (UL) grant, downlink (DL) grant, a scheduling request (SR), transmission duration, control channel information, data channel information, data information, data transmission information, a transmission time domain structure, scheduling information, a scheduling/hybrid automatic repeat request (HARQ) timing relationship, a numerology parameter, a subframe type, slot information, mini-slot information, a relationship between a subframe and a slot, a relationship between the subframe and a mini-slot, a relationship between the slot and the mini-slot, a traffic type, reference signal information, system information, random access information, time gap information, measurement information, sensing-related information, signal information, power adjustment information, blank resource information, resource configuration information, a frame structure, carrier information, a pattern index number, dynamic resource information, fixed resource information, transmission time window information, beam information, a transmission beam, a transmission beam set, a transmission beam pattern, a reception beam, a reception beam set, a reception beam pattern, a beamforming weight, retransmission information, priority information, or blank resource indication information.

In the present disclosure, the control channel information includes at least one of: a control channel position, a starting position of a control channel, a resource gap of the control channel, a resource size of the control channel, the number of resources of the control channel, a period, a pattern of the control channel, a pattern index number of the control channel, an uplink control channel, or a downlink control channel.

In the present disclosure, the first indication information carrying the control channel information includes obtaining, through the control channel information, a position at which the control channel is transmitted.

In the present disclosure, position attribute of the control channel may be at least one of: cell-specific, UE-specific, group-specific, or common-specific.

In the present disclosure, positions of the control channels of different apparatuses are aligned and/or not aligned.

In the present disclosure, the transmission part is further configured to perform at least one of the following operations: the transmission apparatus sends second indication information on the control channel; a configuration status of a resource between a current control channel position and a next control channel position is obtained according to a second indication; a configuration status of a resource over a period of time starting from the current control channel position is obtained according to the second indication; or a configuration status of a resource over a period of time starting from an offset position is obtained according to the second indication.

In the present disclosure, the second indication information includes at least one of: downlink control information, the uplink grant, the downlink grant, the transmission time domain structure, the control channel position, a data channel position, a gap position, the scheduling information, a sensing operation position, the scheduling/HARQ timing relationship, interference measurement information, the blank resource indication information, whether the data channel position being a dynamic resource, whether indicating the transmission time domain structure, whether indicating a transmission direction of a data channel, the scheduling request (SR), the transmission duration, the data transmission information, the numerology parameter, the subframe type, the slot information, the mini-slot information, the relationship between the subframe and the slot, the relationship between the subframe and the mini-slot, the relationship between the slot and the mini-slot, the traffic type, the reference signal information, the system information, the random access information, the power adjustment information, the blank resource information, the resource configuration information, the frame structure, the carrier information, the pattern index number, the dynamic resource information, the fixed resource information, the transmission time window information, the beam information, the transmission beam, the transmission beam set, the transmission beam pattern, the reception beam, the reception beam set, the reception beam pattern, the beamforming weight, the retransmission information, the priority information, or the blank resource indication information.

In the present disclosure, before performing transmission on a resource between control channel positions, or the resource between the current control channel position and the next control channel position, or over the period of time starting from the current control channel position, or over the period of time starting from the offset position, at least one of the following operations is performed: a sensing operation; an interference measurement operation; an interaction or negotiation operation; no operation and direct transmission on the resource; or transmission according to the second indication information.

In the present disclosure, the sensing operation includes at least one of: an energy sensing operation or a signal detection operation.

In the present disclosure, the energy sensing operation includes at least one of: determining a channel is available in response to determining that detected/sensed energy is not greater than a first threshold value; determining the channel is available in response to determining that the detected/sensed energy is greater than the first threshold value and is not greater than a second threshold value; determining the channel is not available in response to determining that the detected/sensed energy is greater than the second threshold value; or determining the channel is not available in response to determining that the detected/sensed energy is greater than the first threshold value.

In the present disclosure, when the channel is not available, the transmission apparatus performs at least one of: no transmission, signal sounding, reducing transmitting power, transmission direction adjustment, or channel type adjustment.

In the present disclosure, the signal sounding operation includes: identifying information carried in a received signal, or identifying a frequency domain pattern of the received signal.

In the present disclosure, the carried information includes at least one of: whether the channel is available, uplink and downlink transmission information, whether it is orthogonal multiple access, intra-frequency/inter-frequency information, homogeneous system/heterogeneous system information, a beam direction, a beam identifier, a beamforming weight identifier, a cell identifier, an operator identifier, a sequence identifier, a cyclic shift identifier, resource pre-configuration information, or information or a reference number of the frequency domain pattern.

In the present disclosure, the transmission part is further configured to configure a same numerology parameter and/or pattern for different apparatuses, and send a sounding signal according to the configuration. Additionally/alternatively, in actual effective transmission, different apparatuses perform transmission using their own numerology parameters.

In the present disclosure, an interaction or coordination operation includes that: the transmission apparatus notifies a surrounding apparatus of particular information of the transmission apparatus; or transmission apparatuses exchange their particular information.

In the present disclosure, the particular information includes at least one of: the numerology parameter, the transmission time domain structure, a starting position of transmission, an end position of transmission, channel occupation duration, a position of a fixed/predetermined resource, a gap between fixed/predetermined resources, a size of the fixed/predetermined resource, a pattern index of the fixed/predetermined resource, an index of the transmission time domain structure, sensing execution position information, the interference measurement information, a beam direction, the beamforming weight, a beam identifier, a beam pattern, or a beam pattern identifier.

In the present disclosure, an apparatus which receives the particular information performs at least one of: no processing; the sensing operation; adjusting the transmission direction on a resource having opposite transmission directions; channel/signal type adjustment; blanking an interference resource or a misaligned resource; reducing transmitting power of the interference resource or the misaligned resource; beam direction adjustment; adjusting the transmitting power on a beam; or blanking the beam direction.

In the present disclosure, a manner of processing interference between the control channel and the data channel in the same time domain zone includes at least one of: determining a processing manner according to a priority of the control channel and a priority of the data channel; the transmission apparatus performing a sensing operation before transmission of an actual control channel resource and/or an actual data channel resource; reducing the transmitting power on a data channel aligned with the control channel position; different apparatuses performing interference measurement or performing interaction or notifying to inform a surrounding apparatus of particular information before the control channel and the data channel; blanking a data channel resource and/or a control channel resource in the same time zone; or adjusting a beam direction and/or transmitting power on a beam of the data channel and/or the control channel.

In the present disclosure, the step of determining the processing manner according to the priority of the control channel and the priority of the data channel includes at least one of: in the case where the control channel has a higher priority, blanking a data channel resource aligned with the control channel resource, or reducing transmitting power of the data channel aligned with the control channel resource, or performing the sensing operation at a starting position of the data channel resource aligned with the control channel resource, adjusting the data channel aligned with the control channel resource to be a control channel position, or adjusting a data channel transmission beam direction, or blanking a data channel beam range aligned with a control channel beam direction; and/or in the case where the data channel has a higher priority, blanking a control channel resource aligned with the data channel resource, or reducing transmitting power of the control channel aligned with the data channel resource, or performing the sensing operation at or before a starting position of the control channel resource aligned with the data channel resource, or adjusting the control channel aligned with the data channel resource to be a data channel position, or adjusting a control channel transmission beam direction, or blanking a control channel beam range aligned with a data channel beam direction.

In the present disclosure, for a channel having a higher priority, one of the following operations may be performed: the sensing operation, or direct transmission, or direct transmitting a sounding signal before an actual transmission resource position, or the sensing operation first, transmitting the sounding signal after signal availability is sensed, and then performing actual transmission.

In the present disclosure, the transmission part is further configured to, in a case of different numerology, make different apparatuses configured with the same frequency domain pattern of the sounding signal and/or with the same numerology.

In the present disclosure, the step in which the transmission apparatus performs the sensing operation before the transmission of the actual control channel resource and/or the actual data channel resource includes that: the sensing operation for control channel transmission and the sensing operation for data channel transmission may be performed at the same position, or different positions.

In the present disclosure, the sensing operation for the data channel transmission is performed at first k OFDM symbols of the data channel position. k is a positive integer greater than and/or equal to 1.

In the present disclosure, the step in which different apparatuses perform interference measurement or inform a surrounding apparatus of particular information by interaction or notifying before the control channel and the data channel includes: determining a channel attribute of an overlapping resource of the control channel and the data channel based on an interference measurement result; and/or exchanging/notifying the interference measurement result and/or an interference resource position, and/or a high-interference indication, and/or a used numerology parameter, and/or a channel attribute adjustment indication, and/or a blank resource indication, and/or a power adjustment indication, and/or a priority level, and/or a predetermined resource transmission structure.

In the present disclosure, the priorities include at least one of: priorities of different traffic, priorities of different base stations, priorities of different operators, priorities of different channels and/or signals, priorities of different systems, or priorities of different channel types.

In the present disclosure, the data channel or data channel information includes at least one of: an uplink data channel, a downlink data channel, a data channel position, a resource size of the data channel, a starting position of the data channel, a resource gap of the data channel, the number of resources of the data channel, a period, a pattern of the data channel, or a pattern index number of the data channel.

In the present disclosure, the transmission time domain structure includes at least one of: the data channel, a gap, a control channel, various combinations thereof, and one or more of the various combinations thereof.

In the present disclosure, the scheduling information includes at least one of: a size of a transmission block (TB), a modulation coding scheme (MCS), a redundancy version (RV), a retransmission indication, or a HARQ process number.

In the present disclosure, the scheduling/HARQ timing relationship includes at least one of: a timing relationship between downlink control and downlink data, a timing relationship between the downlink control and uplink data, a timing relationship between the uplink data and uplink control, or a timing relationship between the downlink data and the uplink control.

In the present disclosure, the numerology parameter includes at least one of: a subcarrier spacing, a CP, a slot, a mini-slot, the number of OFDM symbols in the mini-slot, the number of OFDM symbols in the slot, a subframe, a length of an OFDM symbol in the subframe, the number of mini-slots in the subframe, the number of slots in the subframe, the number of mini-slots in the slot, or the gap.

In the present disclosure, the subframe type includes at least one of: an uplink subframe, a downlink subframe, or a mixed subframe type.

In the present disclosure, the system information includes at least one of: a master information block (MIB), a system information block (SIB), or a physical broadcast channel (PBCH).

In the present disclosure, the hybrid subframe type includes at least one of the following: downlink control+data; downlink control+gap+data; downlink control+data+gap; gap+downlink control+data; gap+downlink control+gap+data; gap+downlink control+data+gap; downlink control+gap+data+gap; gap+downlink control+gap+data+gap; data+uplink control; data+gap+uplink control; data+uplink control+gap; gap+data+uplink control; gap+data+uplink control+gap; data+gap+uplink control+gap; gap+data+gap+uplink control+gap; downlink control+data+uplink control; downlink control+gap+data+uplink control; downlink control+data+gap+uplink control; downlink control+data+uplink control+gap; gap+downlink control+data+uplink control; downlink control+gap+data+gap+uplink control; downlink control+data+gap+uplink control+gap; downlink control+gap+data+uplink control+gap; gap+downlink control+gap+data+uplink control; gap+downlink control+data+gap+uplink control; gap+downlink control+data+uplink control+gap; gap+downlink control+gap+data+gap+unplink control; gap+downlink control+gap+data+uplink control+gap; or downlink control+gap+data+gap+uplink control+gap.

In the present disclosure, the gap information or the measurement information or the sensing-related information includes at least one of: a time domain starting position of the gap, a time domain length of the gap, an end position of the gap, a starting position of sensing, a time domain length of the sensing, an end position of the sensing, a first threshold value, a second threshold value, a sensing signal, a sensing position pattern, a frequency domain pattern of the sensing signal, a starting position of a measurement resource, a size of the measurement resource, a gap of the measurement resource, an end position of the measurement resource, an interference level indication, a measurement signal, a spatial domain beam direction, or the beamforming weight.

Description of the above device embodiments is similar to description of the above method embodiments, and the device embodiments have similar beneficial effects as the method embodiments. For technical details not disclosed in the device embodiments of the present disclosure, reference may be made to the description of the method embodiments of the present disclosure for understanding.

In the embodiments of the present disclosure, the interference processing method, if implemented in the form of software functional modules and sold or used as independent products, may also be stored in a computer-readable storage medium. Based on this understanding, the technical solutions provided by the embodiments of the present disclosure substantially, or the part contributing to the existing art, may be embodied in the form of a software product. The computer software product is stored in a storage medium and includes several instructions for enabling a computer apparatus (which may be a personal computer, a server or a network apparatus, etc.) to execute all or part of the methods provided by the embodiments of the present disclosure. The foregoing storage medium includes: a USB flash disk, a mobile hard disk, a read only memory (ROM), a magnetic disk, an optical disk or another medium capable of storing program codes. In this way, the embodiments of the present disclosure are not limited to any particular combination of hardware and software.

Accordingly, an embodiment of the present disclosure provides a computer-readable storage medium configured to store computer programs for executing the steps in the above interference processing method when the computer programs are executed by a processor.

Accordingly, an embodiment of the present disclosure provides an interference processing apparatus. The apparatus includes a memory and a processor. The memory is configured to store computer programs executable by the processor, and the processor is configured to execute the programs to implement the steps in the above interference processing method.

It should be noted that embodiments and operations of the subject matter described in the specification can be implemented in digital electronic circuitry or in computer software, firmware, or hardware, and the structures and the structural equivalents disclosed in the specification or a combination of one or more of these structures and structural equivalents are included. Embodiments of the subject matter described in the specification can be implemented as one or more computer programs, i.e., one or more computer program instruction modules, which are encoded onto one or more computer storage media for execution by the data processing device or for control of operations of the data processing device. Alternatively or additionally, computer instructions can be encoded onto an artificially-generated propagating signal (e.g., a machine-generated electrical signal, optical signal, or electromagnetic signal) that is generated to encode the information for transmission to a suitable receiver device for execution by the data processing device. The computer storage medium can be or be included in a computer-readable storage apparatus, a computer-readable storage carrier, a random or serial access memory array or apparatus, or a combination of one or more thereof. Moreover, the computer storage medium is not a propagating signal, but can be a source or a target of computer program instructions that are encoded in the artificially-generated propagating signal. The computer storage medium can also be or be included in one or more separate components or media (e.g., multiple CDs, disks, or other storage apparatuses). Therefore, the computer storage medium may be tangible.

The operations described in the specification can be implemented as operations performed by the data processing apparatus on data stored on one or more computer-readable storage apparatuses or received from other sources.

The term "client" or "server" includes all types of devices, apparatuses, and machines for processing data, and includes, for example, a programmable processor, a computer, a system on chip, or a plurality or combination thereof. The device can include special purpose logic circuitry, such as a field programmable gate array (FPGA) or an application specific integrated circuit (ASIC). In addition to hardware, the device can also include codes for creating an execution environment of the computer programs of interest, for example, for constituting processor firmware, a protocol stack, a database management system, an operating system, a cross-platform operating environment, a virtual machine, or a combination of one or more thereof. The device and execution environment can implement a variety of different computing model infrastructures, such as network services, distributed computing, and grid computing infrastructures.

A computer program (also referred to as a program, software, software application, script, or code) can be written in any programming language (including an assembly language, interpreted language, descriptive language or programming language), and can be deployed in any form (including as an independent program, or as a module, component, subroutine, object, or another unit suitable for use in a computing environment). The computer program may, but may not necessarily, correspond to a file in a file system. The program can be stored (e.g., stored in one or more scripts of a markup language document) in a part of the file that holds other programs or data, in a single file dedicated to the program of interest, or in multiple collaboration files (e.g., a part of files storing one or more modules, sub-modules, or codes). The computer program can be deployed to be executed on one or more computers located at one site, or distributed across multiple sites and interconnected over a communication network.

The processes and logic flows described in the specification can be performed by one or more programmable processors executing one or more computer programs to perform actions by operating input data and generating output. The above processes and logic flows can also be performed by special purpose logic circuitry, and the device can also be implemented as the special purpose logic circuitry, such as an FPGA or an ASIC.

A processor suitable for the execution of a computer program includes, for example, a general purpose microprocessor and a special purpose microprocessor, and any one or more processors of any type of digital computer. Generally, a processor receives instructions and data from a read only memory or a random access memory or both the read only memory and the random access memory. Main elements of computing are a processor for performing actions in accordance with instructions and one or more memories for storing the instructions and data. Generally, a computer further includes one or more mass storage apparatuses (e.g., magnetic disks, magneto-optical disks, or optical disks) for storing data, or is operatively coupled to the one or more mass storage apparatuses for receiving data therefrom, or for sending data thereto, or for both receiving data therefrom and sending data thereto. However, the computer does not need to have such an apparatus. Moreover, the computer can be embedded into another apparatus, such as a mobile phone, a personal digital assistant (PDA), a mobile audio player or a mobile video player, a game console, a global positioning system (GPS) receiver, or a mobile storage apparatus (e.g., a universal serial bus (USB) flash drive). The above are just examples. An apparatus suitable for storing computer program instructions and data includes all forms of non-volatile memories, media and storage apparatuses, and includes, for example, semiconductor storage apparatuses (e.g., EPROM, EEPROM, and flash memory apparatuses), magnetic disks (e.g., internal hard disks or mobile hard disks), magneto-optical disks, and CD-ROM and DVD-ROM disks. The processor and memory can be supplemented by or included in special purpose logic circuitry.

Embodiments of the subject matter described in the specification can be implemented in a computing system. The computing system includes back-end components (e.g., a data server), or includes middleware components (e.g., an application server), or includes front-end components (e.g., a client computer, with a graphical user interface or a web browser, through which the user can interact with the embodiments of the subject matter described herein), or includes any combination of one or more of the above-mentioned back-end components, middleware components, or front-end components. The components of the system can be interconnected in any form of digital data communication or via a medium (e.g., a communication network). Examples of the communication network include a local area network (LAN) and a wide area network (WAN), an interconnected network (e.g., the Internet), and an end-to-end network (e.g., an ad hoc end-to-end network).

The features described in the present application are implemented on a smart television module (or connected television module, hybrid television module, etc.). The smart television module may include processing circuitry configured to integrate more traditional television program sources (e.g., program sources received via cable, satellite, air, or other signals) with Internet connectivity. The smart television module may be physically integrated into a television set or may include a separate apparatus such as a set top box, a Blu-ray or another digital media player, a game console, a hotel television system, and another companion apparatus. The smart television module may be configured to enable viewers to search for and find videos, movies, pictures or other content on the network, on local cable channels, on satellite television channels, or on local hard drives. A set top box (STB) or a set top unit (STU) may include an information-applicable apparatus that includes a tuner coupled to the television set and an external signal source to tune the signal to be content later displayed on a television screen or other playback apparatuses. The smart television module may be configured to provide a home screen or a top screen including icons for a variety of different applications (e.g., web browsers and multiple streaming services, connected cable or satellite media sources, other network "channels", etc.). The smart television module may also be configured to provide electronic programs for the user. A companion application of the smart television module may be run on the mobile computing apparatus to provide the user with additional information related to the available programs, thereby enabling the user to control the smart television module and the like. In alternative embodiments, this feature may be implemented on portable computers or other personal computers (PCs), smart phones, other mobile phones, handheld computers, tablet PCs, or other computing apparatuses.

The description includes a number of implementation details which are not to be construed as limiting the scope of any claim, but as describing the features specific to the particular embodiments. Particular features described in the specification before and after the independent embodiments can also be implemented in a combination of single embodiments. Conversely, various features that are described in the context of a single embodiment can be implemented in the various embodiments individually or in any suitable sub-combination. Moreover, although features may be described above as in a particular combination, even as originally required, in some cases one or more features in the required combination can be removed from the combination and the required combination may be a sub-combination or a sub-combination variant.

Similarly, the operations are depicted in a particular order in the drawings, which should not be construed as requiring that the operations should be performed in the illustrated particular order or sequential order or that all of the operations illustrated are performed to achieve the desired result. Multitasking and parallel processing may be advantageous in certain circumstances. Furthermore, the separation of various system components in the above embodiments should not be understood as requiring that the separation be implemented in all embodiments, and it should be understood that the described program components and systems can generally be integrated together in a single software product or packaged into multiple software products.

Therefore, particular embodiments of the subject matter have been described. Other embodiments are within the scope of the claims described below. In some cases, the actions defined in the claims can be performed in a different order and the desired results can still be achieved. Moreover, the processes depicted in the drawings are not necessarily performed in the illustrated particular order or sequential order to achieve the desired results. In particular embodiments, multitasking or parallel processing may be used.

INDUSTRIAL APPLICABILITY

In the embodiments, the transmission apparatus obtains the first indication information and then performs transmission on the particular resource according to the first indication information. Thus, the cross-link interference caused by introduction of the flexible duplex mode is reduced or decreased or solved to some extent.

What is claimed is:

1. An interference processing method, comprising:
   obtaining, by a transmission apparatus, first indication information; and
   performing, by the transmission apparatus, transmission on a particular resource according to the first indication information;
   wherein the first indication information carrying control channel information comprises:
      obtaining, through the control channel information, a position at which a control channel is sent;
   wherein a manner of processing interference between the control channel and a data channel in a same time domain zone comprises: determining a processing manner according to a priority of the control channel and a priority of the data channel;
   wherein determining the processing manner according to the priority of the control channel and the priority of the data channel comprises at least one of:
   in a case of the control channel having a higher priority, blanking a data channel resource aligned with a control channel resource, or reducing transmitting power of the data channel aligned with the control channel resource, or performing a sensing operation at a starting position of the data channel resource aligned with the control channel resource, adjusting the data channel aligned with the control channel resource to be a control channel position, or adjusting a data channel transmission beam direction, or blanking a data channel beam range aligned with a control channel beam direction; or
   in a case of the data channel having a higher priority, blanking the control channel resource aligned with the data channel resource, or reducing transmitting power of the control channel aligned with the data channel resource, or performing the sensing operation at or before a starting position of the control channel resource aligned with the data channel resource, or adjusting the control channel aligned with the data channel resource to be a data channel position, or adjusting a control channel transmission beam direction, or blanking a control channel beam range aligned with a data channel beam direction.

2. The method of claim 1, wherein the first indication information comprises at least one of:
   an uplink (UL) grant, a downlink (DL) grant, a scheduling request (SR), a transmission duration, control channel information, data channel information, data information, data transmission information, a transmission time domain structure, scheduling information, a scheduling/hybrid automatic repeat request (HARD) timing relationship, a numerology parameter, a subframe type, slot information, mini-slot information, a relationship between a subframe and a slot, a relationship between the subframe and a mini-slot, a relationship between the slot and the mini-slot, a traffic type, reference signal information, system information, random access information, time gap information, measurement information, sensing-related information, signal information, power adjustment information, blank resource information, resource configuration information, a frame structure, carrier information, a pattern index number, dynamic resource information, fixed resource information, transmission time window information, beam information, a transmission beam, a transmission beam set, a transmission beam pattern, a reception beam, a reception beam set, a reception beam pattern, a beamforming weight, retransmission information, priority information, or blank resource indication information.

3. The method of claim 2, wherein the control channel information comprises at least one of:
   a position of a control channel, a starting position of the control channel, a resource gap of the control channel, a resource size of the control channel, a number of resources of the control channel, a period, a pattern of the control channel, a pattern index number of the control channel, an uplink control channel, or a downlink control channel.

4. The method of claim 2, wherein the data channel or data channel information comprises at least one of:
   an uplink data channel, a downlink data channel, a data channel position, a resource size of the data channel, a starting position of the data channel, a resource gap of the data channel, a number of resources of the data channel, a period, a pattern of the data channel, or a pattern index number of the data channel.

5. The method of claim 2, wherein the gap information or the measurement information or the sensing-related information comprises at least one of:
   a time domain starting position of the gap, a time domain length of the gap, an end position of the gap, a starting position of sensing, a time domain length of the sensing, an end position of the sensing, a first threshold value, a second threshold value, a sensing signal, a sensing position pattern, a frequency domain pattern of the sensing signal, a starting position of a measurement resource, a size of the measurement resource, a gap of the measurement resource, an end position of the measurement resource, an interference level indication, a measurement signal, a spatial domain beam direction, or the beamforming weight.

6. The method of claim 1, further comprising at least one of:
   sending, by the transmission apparatus, second indication information on the control channel;
   obtaining a configuration status of resources between a current control channel position and a next control channel position according to the second indication information;
   obtaining, according to the second indication information, a configuration status of resources over a period of time starting from the current control channel position; or
   obtaining, according to the second indication information, a configuration status of resources over a period of time starting from an offset position.

7. The method of claim 6, wherein the second indication information comprises at least one of:
- downlink control information, the uplink grant, the downlink grant, the transmission time domain structure, the control channel position, a data channel position, a gap position, the scheduling information, a sensing operation position, the scheduling/HARQ timing relationship, interference measurement information, whether the data channel position being a dynamic resource, whether to indicate the transmission time domain structure, whether to indicate a transmission direction of a data channel, the scheduling request, the transmission duration, the data transmission information, the numerology parameter, the subframe type, the slot information, the mini-slot information, the relationship between the subframe and the slot, the relationship between the subframe and the mini-slot, the relationship between the slot and the mini-slot, the traffic type, the reference signal information, the system information, the random access information, the power adjustment information, the blank resource information, the resource configuration information, the frame structure, the carrier information, the pattern index number, the dynamic resource information, the fixed resource information, the transmission time window information, the beam information, the transmission beam, the transmission beam set, the transmission beam pattern, the reception beam, the reception beam set, the reception beam pattern, the beamforming weight, the retransmission information, the priority information, or the blank resource indication information.

8. The method of claim 7, wherein the priority comprises at least one of: priorities of different traffic, priorities of different base stations, priorities of different operators, priorities of different channels and/or signals, priorities of different systems, or priorities of different channel types.

9. The method of claim 6, wherein before performing transmission on resources between control channel positions, or the resources between the current control channel position and the next control channel position, or over the period of time starting from the current control channel position, or over the period of time starting from the offset position, at least one of the following operations is performed:
- a sensing operation; an interference measurement operation; an interaction or negotiation operation; no operation and direct transmission on the resource; or transmission according to the second indication information.

10. The method of claim 9, wherein the sensing operation comprises at least one of: an energy sensing operation or a signal detection operation,
- wherein the energy sensing operation comprises at least one of:
  - determining a channel is available in response to determining that detected/sensed energy is not greater than a first threshold value;
  - determining the channel is available in response to determining that the detected/sensed energy is greater than the first threshold value and is not greater than a second threshold value;
  - determining the channel is not available in response to determining that the detected/sensed energy is greater than the second threshold value; or
  - determining the channel is not available in response to determining that the detected/sensed energy is greater than the first threshold value,
- wherein in a case where the channel is not available, the transmission apparatus performs at least one of: no transmission, a signal sounding operation, transmitting power reducing operation, transmission direction adjustment, or channel type adjustment;
or wherein the signal sounding operation comprises: identifying information carried in a received signal, or identifying a frequency domain pattern of the received signal;
- wherein the information carried in the received signal comprises at least one of: whether the channel being available, uplink and downlink transmission information, whether being orthogonal multiple access, intra-frequency/inter-frequency information, homogeneous system/heterogeneous system information, a beam direction, a beam identifier, a beamforming weight identifier, a cell identifier, an operator identifier, a sequence identifier, a cyclic shift identifier, resource pre-configuration information, or information or a reference number of the frequency domain pattern,
or wherein the interaction or negotiation operation comprises:
- notifying, by the transmission apparatus, a surrounding apparatus of particular information of the transmission apparatus; or
- exchanging particular information by transmission apparatuses;
- wherein the particular information comprises at least one of: the numerology parameter, the transmission time domain structure, a transmission starting position, a transmission end position, channel occupancy duration, a position of a fixed/predetermined resource, a gap between fixed/predetermined resources, a size of the fixed/predetermined resource, a pattern index of the fixed/predetermined resource, an index of the transmission time domain structure, sensing execution position information, the interference measurement information, a beam direction, the beamforming weight, a beam identifier, a beam pattern, or a beam pattern identifier.

11. The method of claim 10, further comprising: configuring a same numerology parameter and/or pattern for different apparatuses, and sending a sounding signal according to the configuration, and/or in actual effective transmission, performing, by different apparatuses, transmissions using their own numerology parameters.

12. The method of claim 10, wherein an apparatus which receives the particular information performs at least one of:
- no processing; the sensing operation; transmission direction adjustment of a resource having an opposite transmission direction; channel/signal type adjustment; blanking an interference resource or a misaligned resource; reducing a transmitting power of the interference resource or the misaligned resource; beam direction adjustment; adjustment of transmitting power on a beam; or blanking the beam direction.

13. The method of claim 1, wherein a manner of processing interference between the control channel and a data channel in a same time domain zone further comprises at least one of:
- performing, by the transmission apparatus, a sensing operation before transmission of an actual control channel resource and/or an actual data channel resource;
- reducing transmitting power on a data channel aligned with the control channel position;
- performing, by different apparatuses, interference measurement or informing surrounding apparatus of particular information by interaction or notifying before the control channel and the data channel;

blanking a data channel resource and/or a control channel resource in a same time zone; or adjusting a beam direction and/or transmitting power of a beam of the data channel and/or the control channel.

14. The method of claim 13, wherein performing, by the transmission apparatus, the sensing operation before the transmission of the actual control channel resource and/or the actual data channel resource comprises: the sensing operation for control channel transmission and the sensing operation for data channel transmission are performed at a same position or different positions.

15. The method of claim 13, wherein performing, by different apparatuses, interference measurement or informing particular information to a surrounding apparatus by interaction or notifying before the control channel and the data channel comprises:

determining a channel attribute of an overlapping resource of the control channel and the data channel based on an interference measurement result; and/or informing, by interaction/notifying, the interference measurement result, and/or an interference resource position, and/or a high-interference indication, and/or a numerology parameter to be used, and/or a channel attribute adjustment indication, and/or a blank resource indication, and/or a power adjustment indication, and/or a priority level, and/or a predetermined resource transmission structure.

16. The method of claim 1, wherein for a channel having a higher priority, one of the following operations is performed:

the sensing operation, or direct transmission, or direct sending of a sounding signal before an actual transmission resource position, or performing the sensing operation first, sending the sounding signal after determining that the channel is available, and then performing actual transmission.

17. The method of claim 16, further comprising: in a case of different numerology parameters, different apparatuses are configured with a same frequency domain pattern of the sounding signal and/or with same numerology.

18. An interference processing device, comprising:

an obtaining part, configured to obtain first indication information; and a transmission part, configured to perform transmission on a particular resource according to the first indication information;

wherein the first indication information carrying control channel information comprises:

obtaining, through the control channel information, a position at which a control channel is sent;

wherein a manner of processing interference between the control channel and a data channel in a same time domain zone comprises: determining a processing manner according to a priority of the control channel and a priority of the data channel;

wherein determining the processing manner according to the priority of the control channel and the priority of the data channel comprises at least one of:

in a case of the control channel having a higher priority, blanking a data channel resource aligned with a control channel resource, or reducing transmitting power of the data channel aligned with the control channel resource, or performing a sensing operation at a starting position of the data channel resource aligned with the control channel resource, adjusting the data channel aligned with the control channel resource to be a control channel position, or adjusting a data channel transmission beam direction, or blanking a data channel beam range aligned with a control channel beam direction; or in a case of the data channel having a higher priority, blanking the control channel resource aligned with the data channel resource, or reducing transmitting power of the control channel aligned with the data channel resource, or performing the sensing operation at or before a starting position of the control channel resource aligned with the data channel resource, or adjusting the control channel aligned with the data channel resource to be a data channel position, or adjusting a control channel transmission beam direction, or blanking a control channel beam range aligned with a data channel beam direction.

* * * * *